United States Patent
Niinuma et al.

(10) Patent No.: US 9,223,954 B2
(45) Date of Patent: Dec. 29, 2015

(54) USER DETECTING APPARATUS, USER DETECTING METHOD AND COMPUTER-READABLE RECORDING MEDIUM STORING A USER DETECTING PROGRAM

(71) Applicant: FUJITSU LIMITED, Kawasaki (JP)

(72) Inventors: Koichiro Niinuma, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 291 days.

(21) Appl. No.: 13/668,583

(22) Filed: Nov. 5, 2012

(65) Prior Publication Data

US 2013/0147972 A1   Jun. 13, 2013

(30) Foreign Application Priority Data

Dec. 13, 2011   (JP) .................................. 2011-272519

(51) Int. Cl.
| | | |
|---|---|---|
| G05B 19/00 | (2006.01) | |
| H04N 5/228 | (2006.01) | |
| G06F 21/32 | (2013.01) | |
| G06K 9/00 | (2006.01) | |
| G06K 9/03 | (2006.01) | |
| H04L 29/06 | (2006.01) | |

(52) U.S. Cl.
CPC ............ *G06F 21/32* (2013.01); *G06K 9/00234* (2013.01); *G06K 9/036* (2013.01); *H04L 63/0861* (2013.01)

(58) Field of Classification Search
CPC ................. H04N 21/4753; H04N 2201/3233; H04N 2201/3235; H04N 2201/3236; H04N 2201/3239; H04N 2201/324; H04L 29/08936

USPC .................... 348/207.99; 340/5.81, 5.8, 5.74; 382/103, 118

See application file for complete search history.

(56) References Cited

U.S. PATENT DOCUMENTS

| | | | |
|---|---|---|---|
| 2007/0022304 A1* | 1/2007 | Yanagawa ..................... | 713/186 |
| 2007/0206093 A1 | 9/2007 | Kuwabara et al. | |
| 2009/0060293 A1* | 3/2009 | Nagao et al. .................. | 382/118 |

FOREIGN PATENT DOCUMENTS

JP          7-40722          5/1995

OTHER PUBLICATIONS

Koichiro Niinuma et al., "Soft Biometric Traits for Continuous User Authentication", IEEE Transactions on Information Forensics and Security, vol. 5, No. 4, Dec. 2010, pp. 771-780.

(Continued)

*Primary Examiner* — Tuan Ho
*Assistant Examiner* — Selam Gebriel
(74) *Attorney, Agent, or Firm* — Staas & Halsey LLP

(57) ABSTRACT

A user detecting apparatus includes: a memory that stores a program including a procedure; and a processor that executed the program, the procedure including: obtaining an image captured by a camera, switching between a first mode in which a first user-associated area, which is associated with a user, is detected from the image according to a similarity between a color histogram of the image and a reference color histogram and a second mode in which a second user-associated area, which is associated with the user, is detected from the image according to a feature point extracted from the image, according to luminance of the image, and detecting, from the image, the first user-associated area in the first mode or the second user-associated area in the second mode.

15 Claims, 21 Drawing Sheets

(56) References Cited

OTHER PUBLICATIONS

Paul Viola et al., "Rapid Object Detection using a Boosted Cascade of Simple Features", in Proceedings IEEE Computer Vision and Pattern Recognition, 2001, pp. I_511-I_518.

B.D. Lucas et al., "An Interative Image Registration Technique with an Application to Stereo Vision", in Proc $7^{th}$ IJCAI, Vancouver, B.C., Canada, Aug. 24-28, 1981, pp. 674-679.

Extended European Search Report issued Mar. 9, 2015 in corresponding European Patent Application No. 12190774.5.

Antitza Dantcheva et al., "Bag of soft biometrics for person identification; New trends and challenges", Multimedia Tools and Applications, vol. 2, No. 2, Oct. 27, 2010, pp. 739-777.

Keni Bernardin et al., "Automatic Person Detection and Tracking using Fuzzy Controlled Active Cameras", IEEE Conference on Computer Vision and Pattern Recognition, Jun. 18-23, 2007, pp. 1-8.

Muhammad Khurram Khan et al., "Biometric Driven Initiative System for Passive Continuous Authentication", $7^{th}$ International Conference on Information Assurance and Security (IAS), Dec. 5, 2011, pp. 139-144.

Japanese Office Action issued May 19, 2015 in corresponding Japanese Patent Application No. 2011-272519.

Hirotsune Fujiyoshi, "Image-shooting technique for not missing a target/subject" Sharpshooter, Object Tracking Technology, Journal of the Institute of Image Information and Television Engineers, Japan, Jun. 1, 2008, vol. 62, pp. 849-855.

Antitza Dantcheva et al., "Bag of soft biometrics for person identification; New trends and challenges", Multimedia Tools and Applications, vol. 251, No. 2, Oct. 27, 2010, pp. 739-777.

* cited by examiner

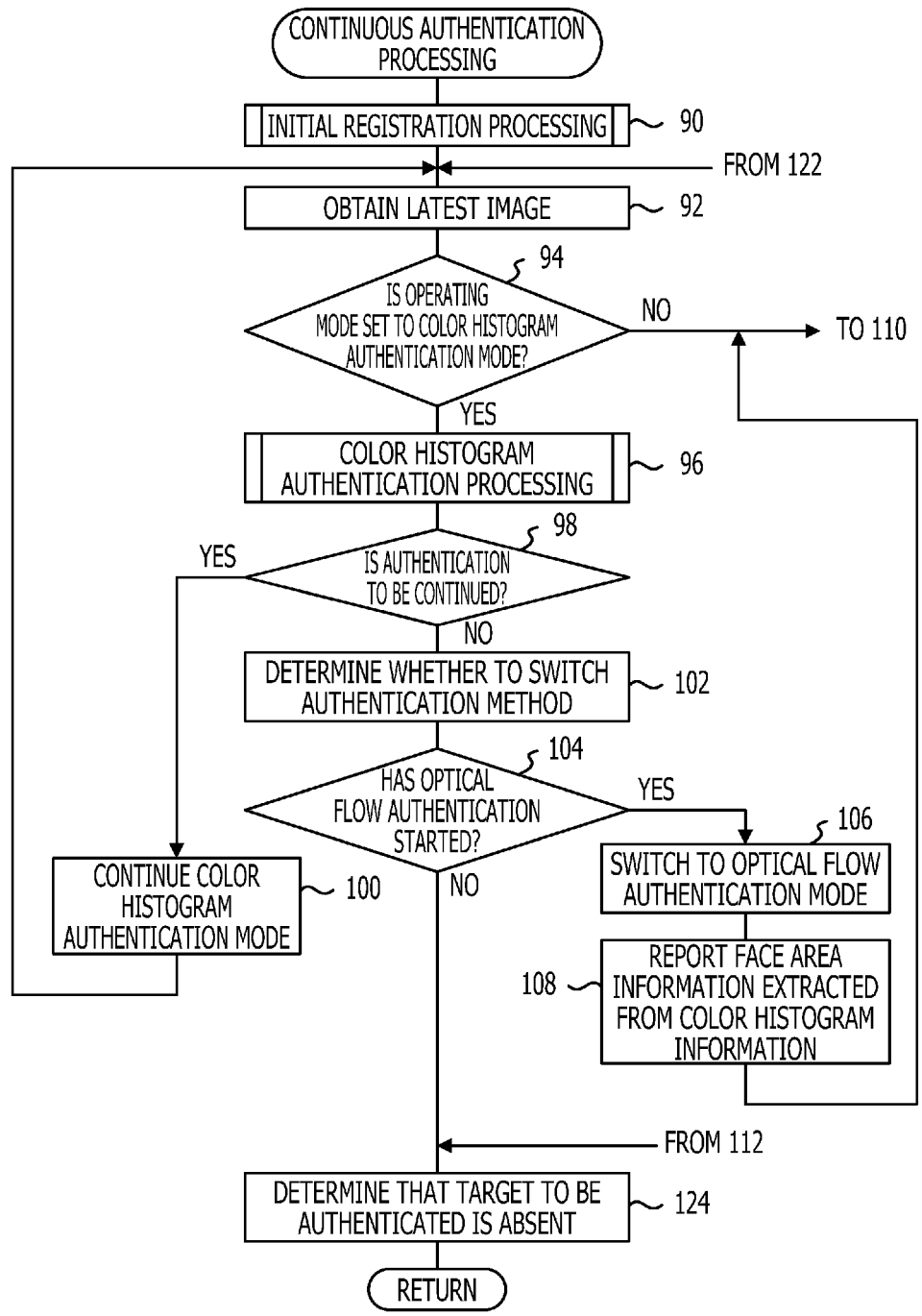

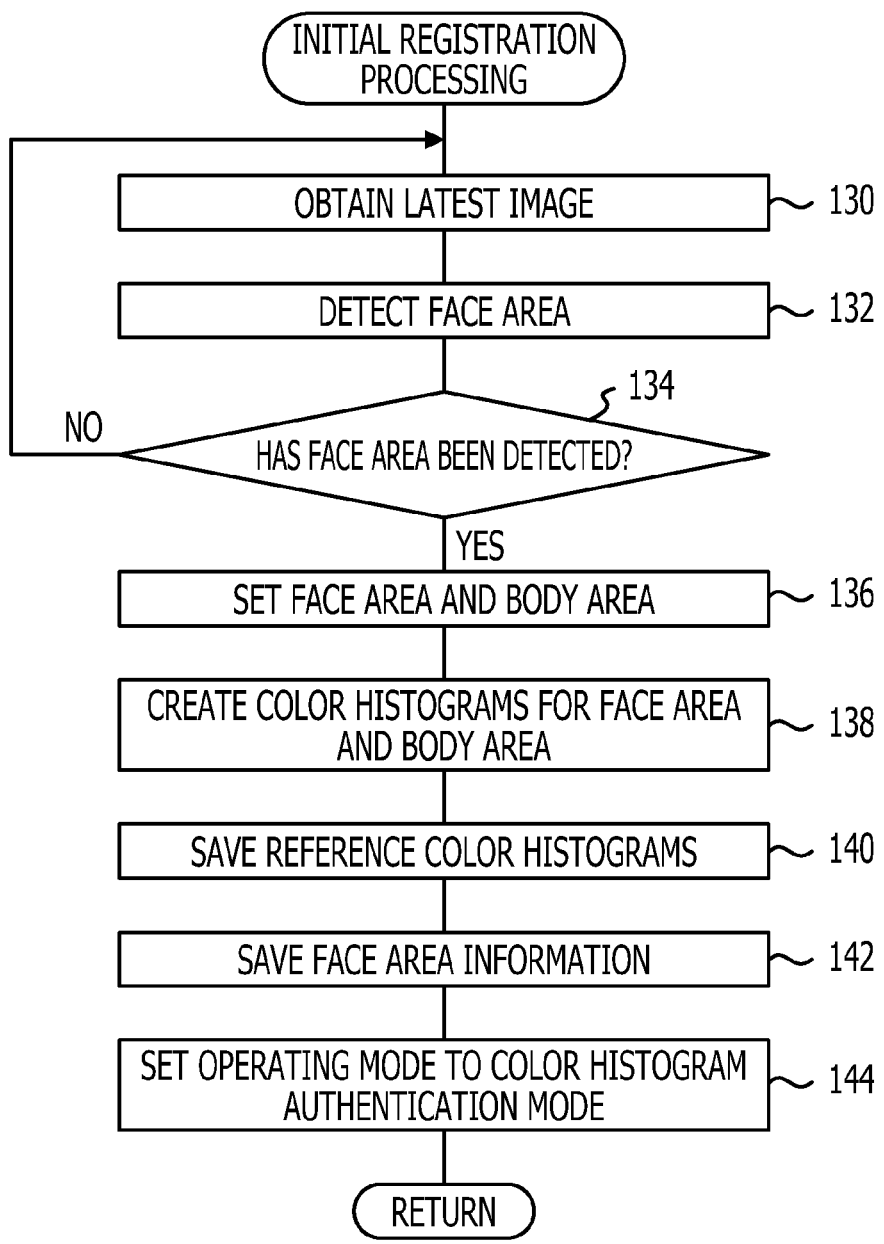

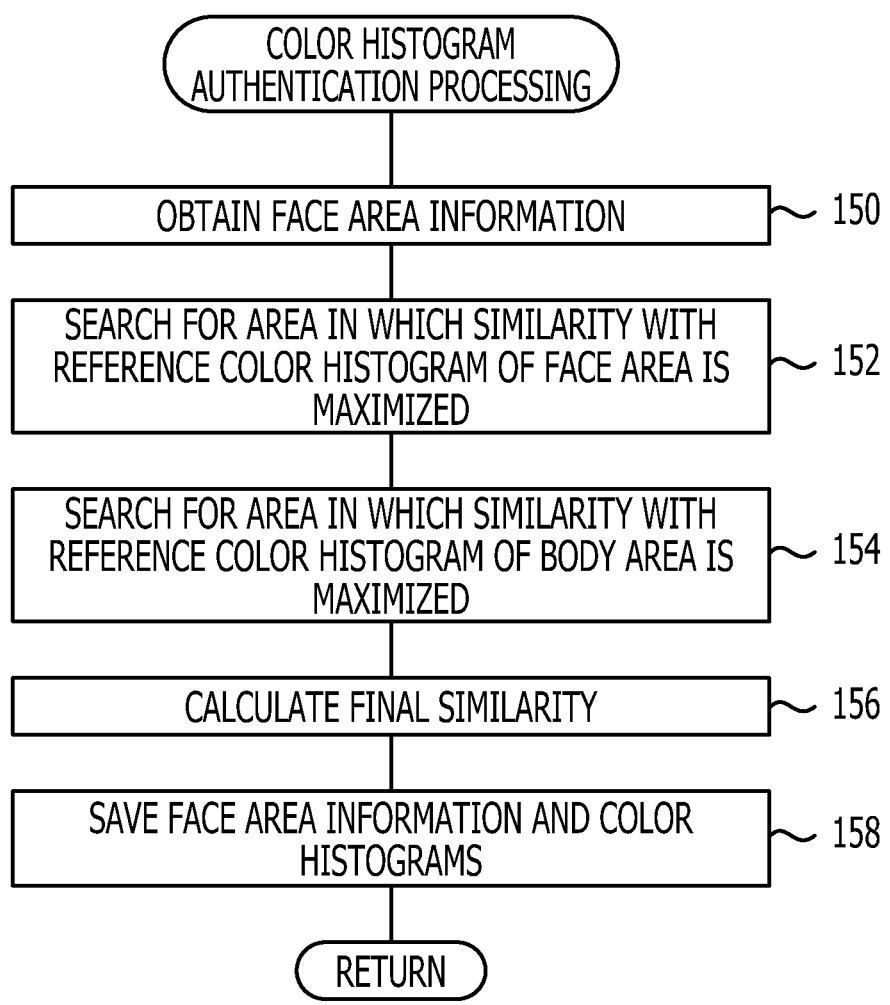

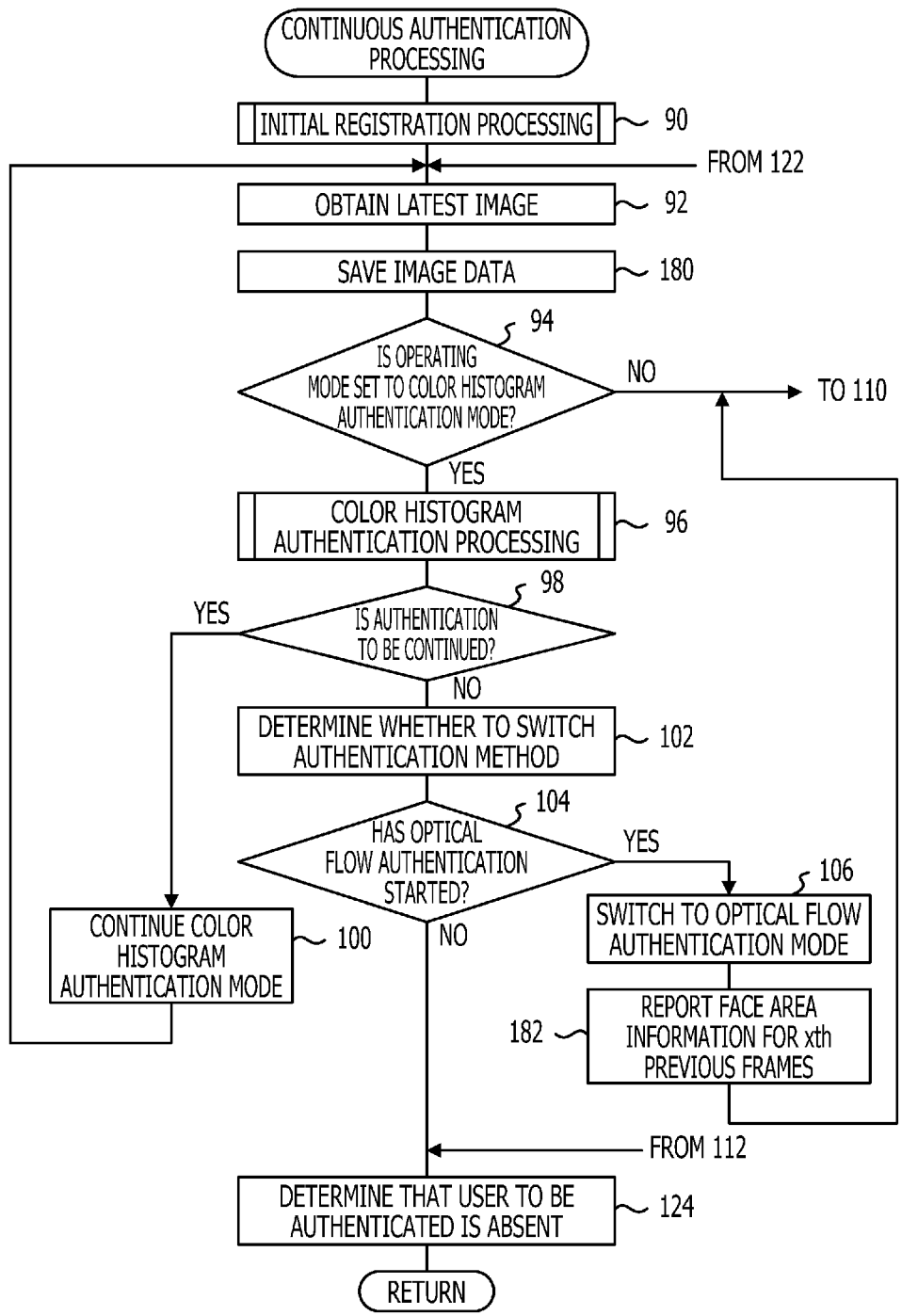

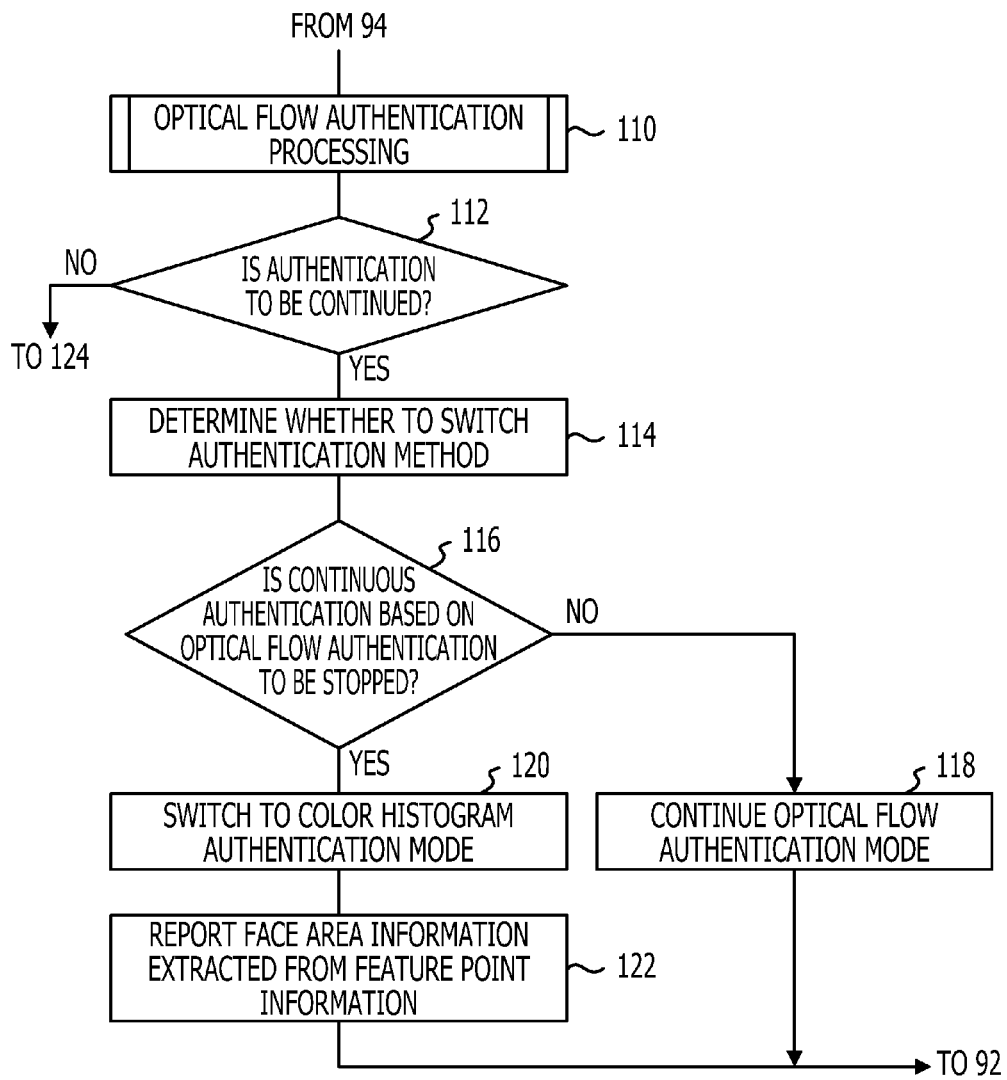

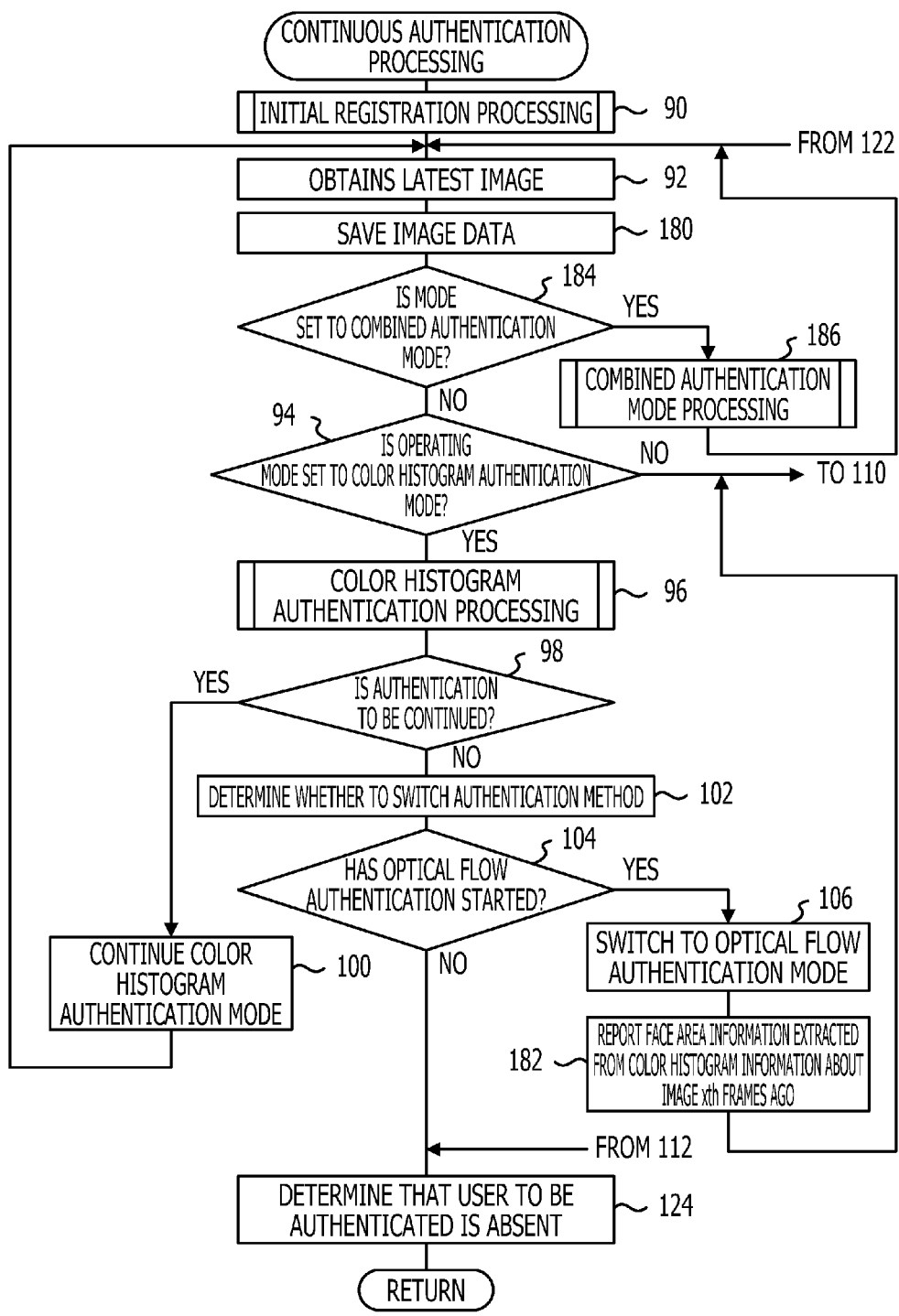

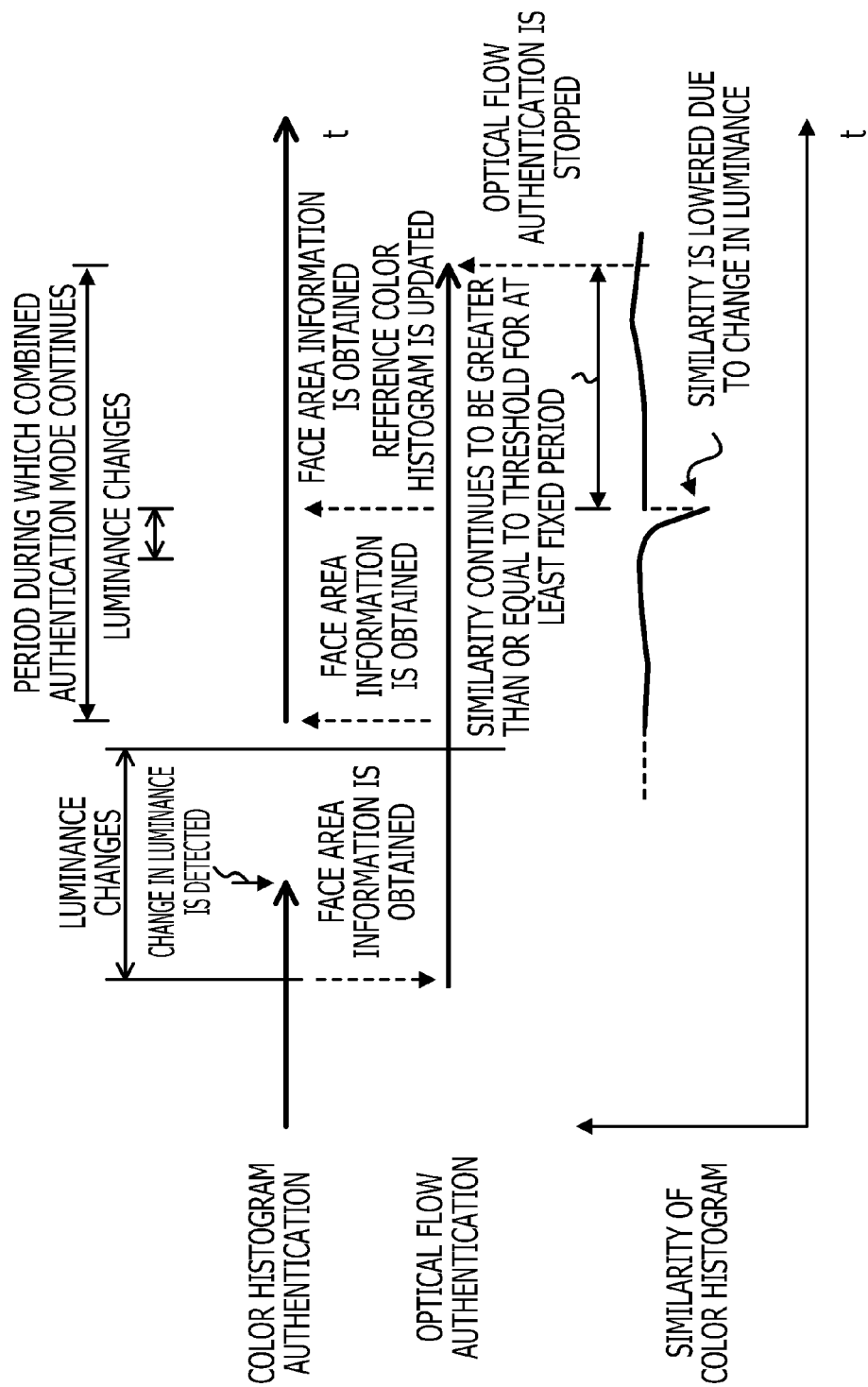

USER DETECTING APPARATUS, USER DETECTING METHOD AND COMPUTER-READABLE RECORDING MEDIUM STORING A USER DETECTING PROGRAM

CROSS-REFERENCE TO RELATED APPLICATION

This application is based upon and claims the benefit of priority of the prior Japanese Patent Application No. 2011-272519, filed on Dec. 13, 2011, the entire contents of which are incorporated herein by reference.

FIELD

The embodiments discussed herein are related to a user detecting apparatus, a user detecting method, and a computer-readable recording medium storing a user detecting program.

BACKGROUND

As information devices have rapidly come into widespread use, a wide variety of types of information has come to be stored in information devices in recent years. Accordingly, a very important issue is to establish a security technology that suppresses, for example, information from leaking from information devices. In view of the above situation, various authentication technologies have been proposed and are being implemented. Authentication technology is technology that uses, for example, password authentication, biometric authentication, card authentication, or the like. However, many existing authentication technologies carry out authentication only at login, so they have the common problem that if, for example, a third party has unauthorized access to an information device while a legitimate user is away from the location at which the information device is installed, the unauthorized access is difficult to detect.

To address the above problem, continuous authentication technologies have been proposed in which the user is subject to continuous authentication even after the user has logged in K. Niinuma, U. Park, A. K. Jain, "Soft Biometric Traits for Continuous User Authentication", IEEE Transactions on Information Forensics and Security, Vol. 5, No. 4, pp. 771-780, 2010, P. Viola and M. Jones, "Rapid object detection using a boosted cascade of simple features", in Proc. IEEE Computer Vision and Pattern Recognition, pp. I_511-I_518, 2001 and B. D. Lucas and T. Kanade, "An iterative image registration technique with an application to stereo vision", in Proc. 7th IJCAI, Vancouver, B. C., Canada, pp. 674-679, 1981.

Color histogram authentication, which is a continuous authentication technology that uses color histograms of an image on which a user is pictured, has the advantage that robust continuous authentication is possible for changes in the orientation of the user in comparison with face authentication and other methods in which key strokes or the like is used. In color histogram authentication, the color histogram of an area associated with a user on an image is registered and the user-associated area on an image is detected according to color histogram similarity with the registered color histogram, for example. Color histogram enables continuous authentication by tracking the movement of the user-associated area.

SUMMARY

According to an aspect of the invention, a user detecting apparatus includes: a memory that stores a program including a procedure; and a processor that executed the program, the procedure including: obtaining an image captured by a camera, switching between a first mode in which a first user-associated area, which is associated with a user, is detected from the image according to a similarity between a color histogram of the image and a reference color histogram and a second mode in which a second user-associated area, which is associated with the user, is detected from the image according to a feature point extracted from the image, according to luminance of the image, and detecting, from the image, the first user-associated area in the first mode or the second user-associated area in the second mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B illustrate a flowchart of continuous authentication processing described in the first embodiment;

FIG. 5 is a flowchart of initial registration processing;

FIG. 7 is a flowchart of color histogram authentication processing;

FIGS. 12A and 12B are a flowchart of continuous authentication processing described in the second embodiment;

FIGS. 15A and 15B are a flowchart of continuous authentication processing described in the third embodiment;

FIG. 18 is a timing diagram illustrating update of a reference color histogram in the combined authentication mode and other processing.

DESCRIPTION OF EMBODIMENTS

When detecting the user-associated area by using a color histogram, however, although the user is present, the user-associated area may not be identified due a change in the color histogram. This may occur when, for example, the luminance of the image to be used in authentication changes sharply due to a sharp change in illumination conditions or another reason. This has been problematic in that authentication is discontinued or the user is mistakenly recognized as having moved away from the information device.

The luminance of an image changes sharply when, for example, lighting fixtures in the room in which the information device is being used are turned on or off. Another example of sharp change in the luminance of the image occurs when the amount of external light that enters a room, in which there is a moving body and the information device is being used, changes sharply.

When an exposure control function that maintains the luminance of an entire image at a substantially fixed level is provided in a photograph unit that takes a picture of the user, for example, the luminance of the user-associated area may also change sharply. This is because exposure is changed according to a change in the luminance in a photograph range when, for example, a person passes behind the user.

If the photograph unit is a camera built into an information device such as a personal computer (PC) and the camera is being used by another application as well, it is difficult to turn off the above exposure control function to suppress a sharp change in the luminance in the user-associated area.

The technology in the present disclosure aims to suppress continuous detection of a user-associated area from being discontinued even when image luminance used to detect the user-associated area changes sharply.

Examples of embodiments of a technology in the present disclosure will be described in detail with reference to the drawings, focusing on aspects in which the technology in the present disclosure is applied to continuous authentication.

First Embodiment

Figure 1:
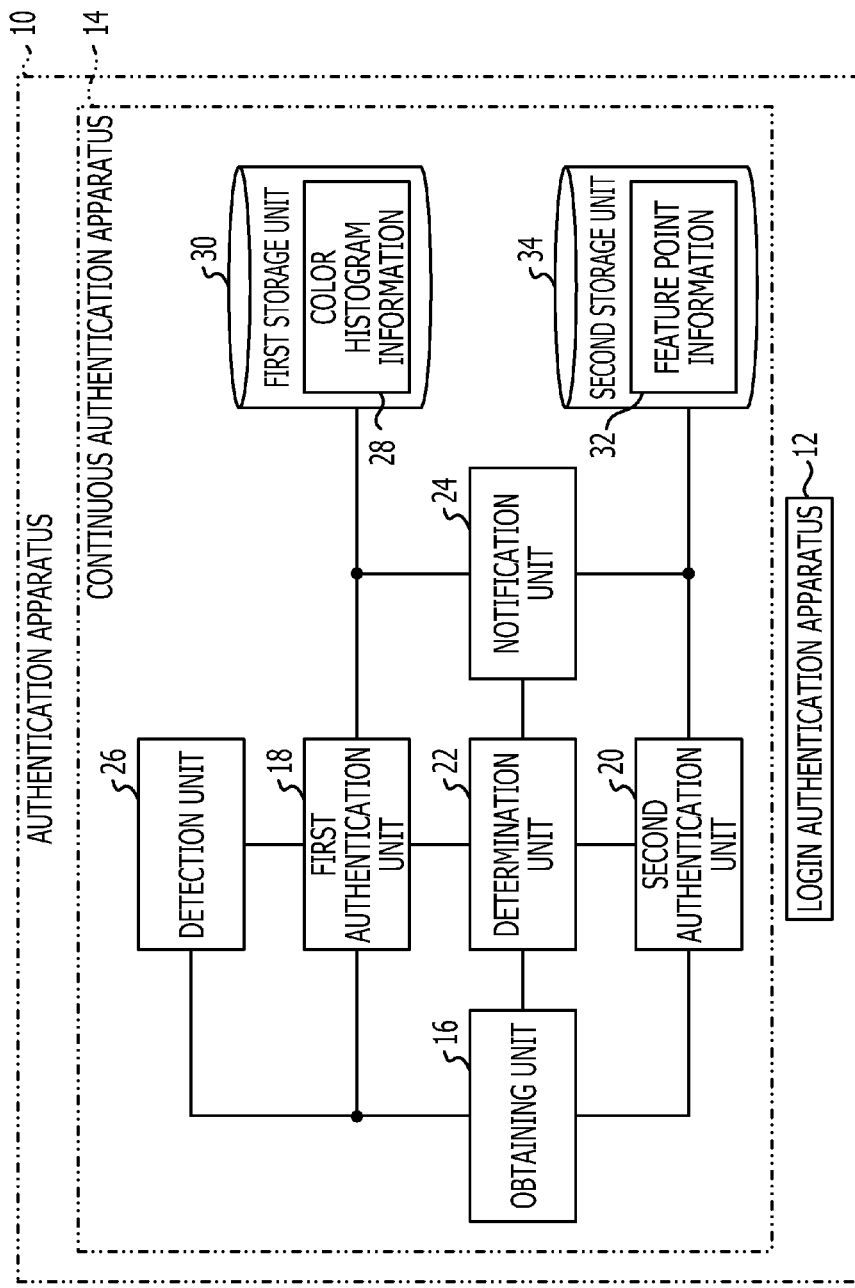
FIG. 1 is a functional block diagram of an authentication apparatus described in a first embodiment.

FIG. 1 is a functional block diagram of an authentication apparatus 10 according to a first embodiment. The authentication apparatus 10, which authenticates a user who uses an information device such a PC or a mobile terminal, includes a login authentication apparatus 12 that performs login authentication and also includes a continuous authentication apparatus 14 that performs continuous authentication.

Login authentication is an authentication of a user who starts to use an information device. Continuous authentication is an authentication of a user who is currently using the information device.

The authentication apparatus 10 is built into, for example, an information device to be used by the user. It is also possible to have an information device function as the authentication apparatus 10. The authentication apparatus 10 may also be implemented by having a computer, which is connected to an information device through a communication link, function as the authentication apparatus 10.

The login authentication apparatus 12 may have a structure to which any of various known authentication methods is applied as the method of authenticating the user. Examples of the various known authentication methods include password authentication, biometric authentication, and card authentication.

The continuous authentication apparatus 14, which is an example of the user detecting apparatus in the technology in the present disclosure, includes an obtaining unit 16, a first authentication unit 18, a second authentication unit 20, a determination unit 22, a notification unit 24, a detection unit 26, a first storage unit 30, and a second storage unit 34.

The first storage unit 30 stores color histogram information 28 and the second storage unit 34 stores feature point information 32.

The first authentication unit 18 is an example of a first detecting unit in the technology in the present disclosure. The second authentication unit 20 is an example of a second detecting unit in the technology in the present disclosure. The determination unit 22 is an example of a switchover determination unit in the technology in the present disclosure.

The obtaining unit 16 periodically obtains image data of images from a photograph unit. The photograph unit periodically takes pictures of the face and part of the body of a user to be authenticated and the background of the user. The user to be authenticated is the user who passed login authentication executed by the login authentication apparatus 12 and is currently using the information device.

When the authentication apparatus 10 is built into the information device, for example, the obtaining unit 16 may include the photograph unit. When a computer connected to the information device through a communication link functions as the authentication apparatus 10, for example, the obtaining unit 16 may be a communication unit that obtains the image data of an image captured by the photograph unit provided in the information device by receiving the image data from the information device.

After the user succeeds in login authentication, the first authentication unit 18 calculates a color histogram of a face area associated with the face of the user present on the image and a color histogram of a body area of the user. For example, histograms in these areas are calculated from the image captured immediately after successful login authentication.

The color histogram of the face area and the color histogram of the body area are stored in the first storage unit 30 as color histogram information 28 for reference color histograms. The first authentication unit 18 uses the reference color histograms to carry out color histogram authentication for an image obtained by the obtaining unit 16 after the reference color histograms are created. In color histogram authentication, user-associated area is detected according to color histogram similarity.

Specifically, for an image obtained by the obtaining unit 16, an area in which the similarity of the color histogram with the relevant reference color histogram is substantially maximized is searched for in the image. More specifically, an area that has maximum similarity with the face area is searched for in a newly obtained image, according to the reference color histogram of the face area. An area having the maximum similarity with the body area is also searched for in a newly obtained image, according to the reference color histogram of the body area.

If the similarity of the color histogram for each searched-for area is greater than or equal to a threshold, the first authentication unit 18 determines that the user is present in the area. If the similarity is less than the threshold, the first authentication unit 18 determines that the user has moved away from the information device.

At the beginning of the start of authentication, the second authentication unit 20 extracts feature points from the face area on the image obtained by the obtaining unit 16. The second authentication unit 20 then stores the extracted feature points in the second storage unit 34 as the feature point information 32. The feature points are, for example, edges, preferably edges having luminance that changes in a plurality of directions.

The second authentication unit 20 uses the feature point information 32 to perform optical flow authentication for the image obtained by the obtaining unit 16. In optical flow authentication, the user-associated area is detected through comparison with feature points.

Specifically, the second authentication unit 20 extracts feature points from an area, on the image obtained by the obtaining unit 16, that corresponds to a previous face area and areas around the previous face area. The second authentication unit 20 then judges correspondence between the extracted feature points and the previous feature points stored as the feature point information 32. If, for an area in a newly acquired image that corresponds to a previous face area and areas around the previous face area, the number of feature points for which correspondence to the previous feature points may be judged is greater than or equal to a given value, the second authentication unit 20 determines that the user is present. This is because it is determined that a face area, which is identified from a given number of feature points or more, is present in an area on the newly obtained image that corresponds to the previous face area and areas surrounding the previous face area.

If the number of feature points for which correspondence to the previous feature points may be judged is less than a given value or an amount that the number of feature points declines by is greater than or equal to a given value, the second authentication unit 20 determines that the user has moved away from the information device.

The determination unit 22 determines which of color histogram authentication executed by the first authentication unit 18 and optical flow authentication executed by the second authentication unit 20 is to be applied as continuous authentication for the user to be authenticated. In this determination by the determination unit 22 as to the selection of an authentication method, at least one of a change in the luminance of the image obtained by the obtaining unit 16 and the similarity of the color histogram of the image is used.

When continuous authentication for the user is changed from color histogram authentication to optical flow authentication, the notification unit 24 notifies the second authentication unit 20 of information that has been obtained so far about the face area recognized in color histogram authentication executed by the first authentication unit 18.

When continuous authentication for the user is changed from optical flow authentication to color histogram authentication, the notification unit 24 notifies the first authentication unit 18 of information that has been obtained so far about the face area recognized in optical flow authentication executed by the second authentication unit 20.

Upon successful login authentication of the user, the detection unit 26 detects the face area corresponding to the face of the user on the image obtained by the obtaining unit 16 and then performs processing to extract the detected face area. The detection unit 26 outputs a face area detection result to the first authentication unit 18. The face area detection result that is output from the detection unit 26 to the first authentication unit 18 is used by the first authentication unit 18 to identify a face area and body area on the image.

Figure 2:
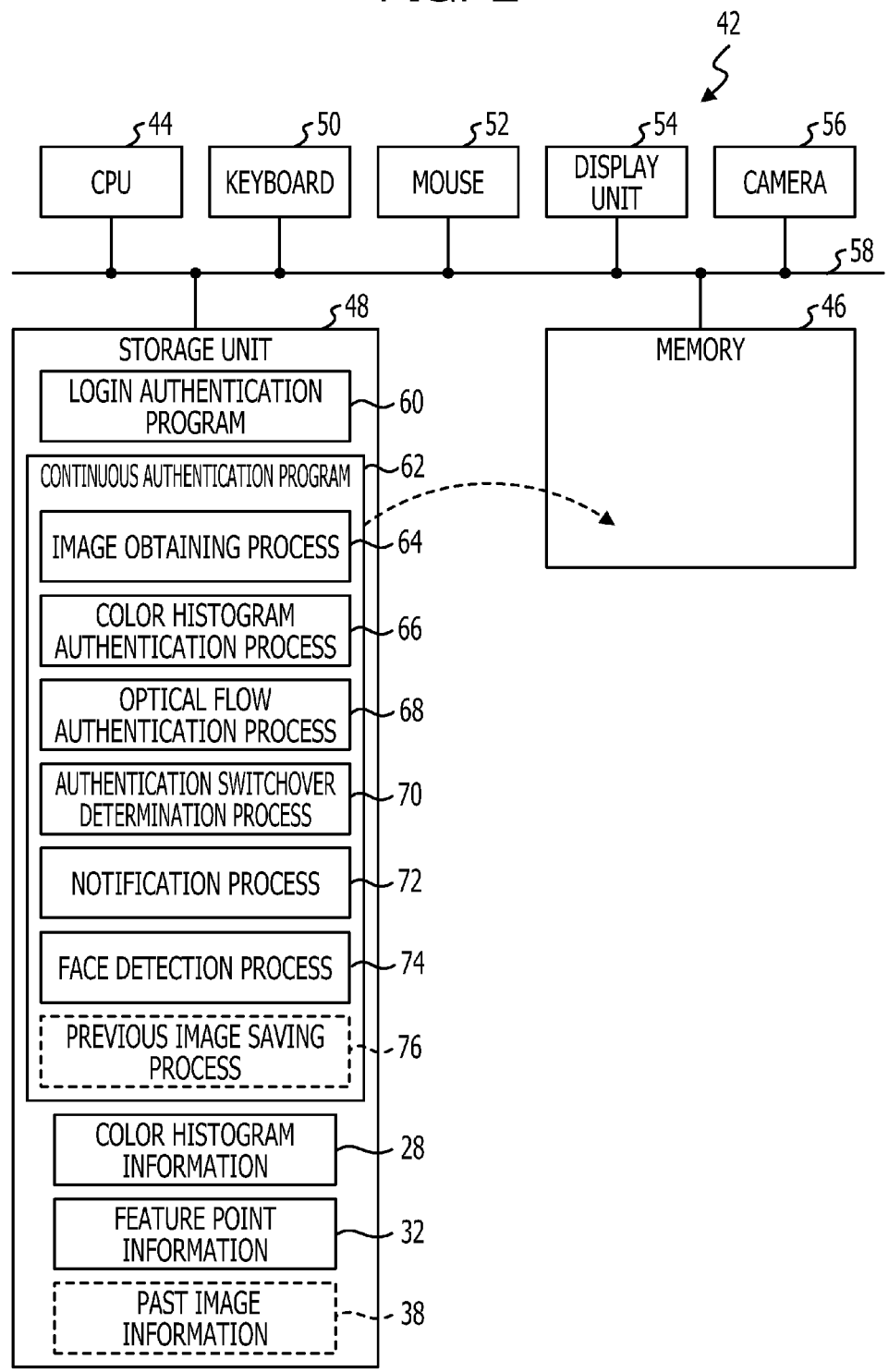
FIG. 2 is a schematic block diagram of a computer that functions as an authentication apparatus.

The authentication apparatus 10 may be implemented by, for example, a computer 42 illustrated in FIG. 2. Although an aspect in which the computer 42 is included in the information device used by the user will be described below, the computer 42 may be connected to the information device through a communication link. The computer 42 includes a central processing unit (CPU) 44, a memory 46, a storage unit 48 that is non-volatile, a keyboard 50, a mouse 52, a display unit 54, and a camera 56, which are mutually connected through a bus 58. The camera 56 is an example of the photograph unit. The camera 56 is disposed so that it may take pictures of the face and part of the body of a user who is using the computer 42, which is included in the information device, as well as the background of the user.

The storage unit 48 may be implemented by a hard disk drive (HDD), a flash memory, or the like. The storage unit 48, which includes a recording medium, stores a login authentication program 60 and a continuous authentication program 62, which are used to have the computer 42 to function as the authentication apparatus 10, as well as the color histogram information 28 and the feature point information 32. The CPU 44 reads out the login authentication program 60 and continuous authentication program 62 from the storage unit 48, stores them in the memory 46, and executes processes included in the login authentication program 60 and continuous authentication program 62 in succession.

The CPU 44 executes processes in the login authentication program 60 to function as the login authentication apparatus 12 illustrated in FIG. 1. The continuous authentication program 62 includes an image obtaining process 64, a color histogram authentication process 66, an optical flow authentication process 68, an authentication switchover determination process 70, a notification process 72, and a face detection process 74. The CPU 44 executes the image obtaining process 64 to function as the obtaining unit 16 illustrated in FIG. 1. The CPU 44 also executes the color histogram authentication process 66 to function as the first authentication unit 18 illustrated in FIG. 1. The CPU 44 also executes the optical flow authentication process 68 to function as the second authentication unit 20 illustrated in FIG. 1. The CPU 44 also executes the authentication switchover determination process 70 to function as the determination unit 22 illustrated in FIG. 1. The CPU 44 also executes the notification process 72 to function as the notification unit 24 illustrated in FIG. 1. The CPU 44 also executes the face detection process 74 to function as the detection unit 26 illustrated in FIG. 1. The continuous authentication program 62 is an example of the user detecting program in the technology in the present disclosure.

When the authentication apparatus 10 is implemented by the computer 42, the storage unit 48, which stores the color histogram information 28, is used as the first storage unit 30, and a partial area of the memory 46 is used as a storage area to store the color histogram information 28. In addition, the storage unit 48, which stores the feature point information 32, is used as the second storage unit 34, and a partial area of the memory 46 is used as a storage area to store the feature point information 32. Thus, after having executed the login authentication program 60 and continuous authentication program 62, the computer 42 functions as the authentication apparatus 10.

The authentication apparatus 10 may be implemented by, for example, a semiconductor integrated circuit, more specifically an application-specific integrated circuit (ASIC) or the like.

Next, the effect of the first embodiment will be described. In color histogram authentication, robust continuous authentication is possible, if the user changes his orientation, as described above. However, color histogram authentication is disadvantageous in that continuous authentication may be discontinued when the luminance of the image used in authentication changes sharply due to a sharp change in illumination conditions or the like.

Optical flow authentication is robust against sharp changes in the luminance of the image that are caused by, for example, changes in illumination conditions. However, when the orientation of the user changes, for example if the user looks to the side, and the number of feature points or correspondence of feature points thereby changes, optical flow authentication may be difficult to continue. Optical flow authentication also has a larger processing load than color histogram authentication and is not suitable to lengthy authentication.

Since color histogram authentication and optical flow authentication have different features as described above, this embodiment carries out optical flow authentication while the luminance of the image changes and carries out color histogram authentication at other times.

Figure 3:
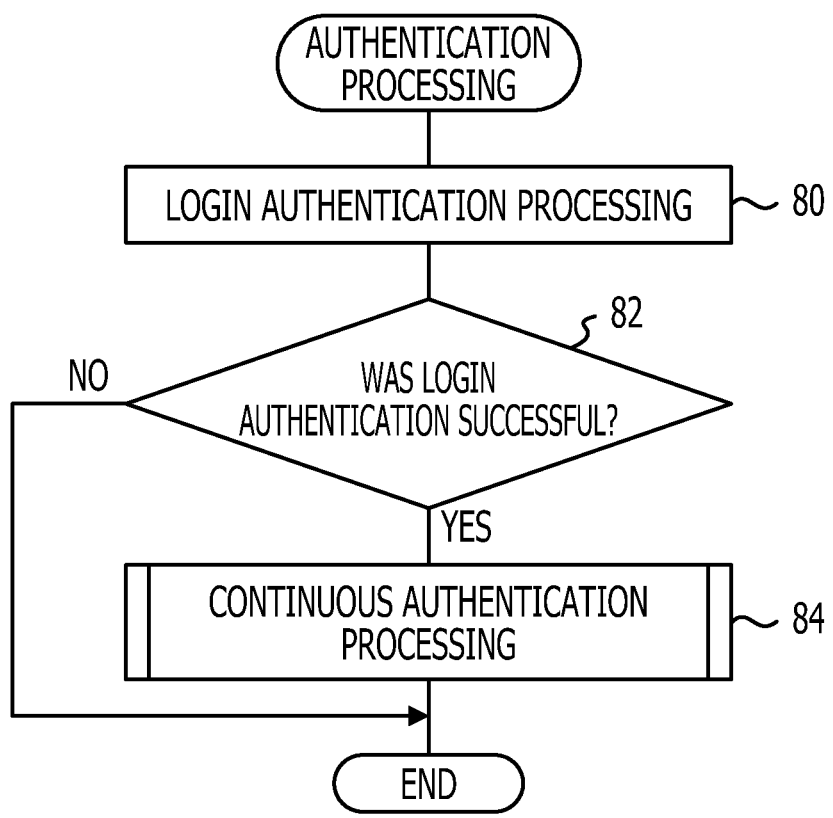
FIG. 3 is a flowchart of authentication processing.

First, authentication processing by the authentication apparatus 10 according to the present embodiment will be described below with reference to the flowchart in FIG. 3. Authentication processing in FIG. 3 is executed when the user starts to use the information device. First, the login authentication apparatus 12 carries out login authentication processing in step 80. The authentication method used in the login authentication processing may be any of various known authentication methods, as described above. The login authentication apparatus 12 then determines in step 82 whether the user has been confirmed as a legitimate user through login authentication.

If the determination in step 82 is negative, the authentication processing is terminated. This suppresses persons other than a legitimate user from using the information device. If the determination in step 82 is affirmative, the login authentication apparatus 12 activates the continuous authentication apparatus 14, after which the sequence proceeds to step 84, where the continuous authentication apparatus 14 carries out continuous authentication processing. Thus, the user who has been confirmed as a legitimate user through login authentication may use the information device while the continuous authentication apparatus 14 continues the continuous authentication processing.

Continuous authentication processing carried out by the continuous authentication apparatus 14 in step 84 in authentication processing illustrated in FIG. 3 will be described in detail with reference to FIGS. 4A and 4B. In continuous authentication processing in FIGS. 4A and 4B, initial registration processing is first carried out in step 90.

Initial registration processing will be described with reference to FIG. 5. First, in step 130, the obtaining unit 16 obtains image data of the latest image captured by the photograph unit.

The detection unit 26 detects the face area of the user, which is present on the image represented by the image data, in step 132. To detect the face area, the detection unit 26 may use any method such as, for example, a method in which a Haar classifier is employed. A method in which a Haar classifier is employed is disclosed in, for example, P. Viola and M. Jones, "Rapid object detection using a boosted cascade of simple features", in Proc. IEEE Computer Vision and Pattern Recognition, pp. I_511-I_518, 2001.

In step 134, the detection unit 26 then determines whether a face area corresponding to the face of the user has been extracted as the result of face area detection in step 132. If, for example, the face of the user did not face toward the photograph unit during photography, the decision in step 134 is negative. The sequence then returns to step 130, after which steps 130 to 134 are repeated until the determination in step 134 becomes affirmative.

If the determination in step 134 is affirmative, the sequence proceeds to step 136, where, according to the result of face area extraction by the detection unit 26, the first authentication unit 18 establishes a face area having a fixed shape that substantially corresponds to the face of the user. The fixed shape is, for example, an ellipse shape or another shape.

Figure 6A:
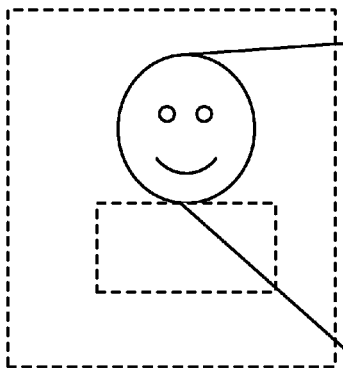
FIG. 6A is a drawing illustrating an example of color histogram information.

The first authentication unit 18 also establishes, below the set face area, a body area having a fixed shape that substantially corresponds to part of the body of the user. The fixed shape is, for example, a rectangular shape. It is also possible to use another method to set the body area. FIG. 6A illustrates an example of the face area drawn with solid lines and an example of the body area drawn with broken lines.

In step 138, the first authentication unit 18 creates a color histogram of the face area of the user and a color histogram of the body area, the face area and body area having been set in step 136. When, for example, the obtaining unit 16 obtains image data that represents the colors of each pixel in an image with a combination of three colors, red, green, and blue (RGB), each color histogram created as described above represents a frequency of each of the three colors, RGB for each three-color combination, as illustrated in FIG. 6A. It is also possible to use a color space other than the RGB color space.

In step 140, the first authentication unit 18 stores the color histograms, which have been created in step 138, of the face area and body area in the first storage unit 30 as the reference color histograms. These reference color histograms are part of the color histogram information 28.

In step 142, the first authentication unit 18 stores information that represents the position and size of the face area of the user, which has been set in step 136, in the first storage unit 30 as part of the color histogram information 28. Thus, information as illustrated in FIG. 6A is stored in the first storage unit 30 as the color histogram information 28. In step 144, the determination unit 22 sets a color histogram authentication mode as the operation mode in continuous authentication, concluding the initial registration processing.

The target area in the color histogram information 28 in FIG. 6A indicates that the center of the face area is located at coordinates (200, 100) on the image and that the size of the face area is 100 pixels wide and 150 pixels high.

The term histogram (R, G, B) in the color histogram displayed in FIG. 6A refers to where a numerical range from 0 to 255 for each color (R, G, B) has been divided into 16 areas; a color histogram is displayed according to a proportion of color in the image assigned to each RGB range. For example, histogram (15, 15, 15) illustrated in FIG. 6A indicates that the proportion of the number of pixels of each color (R, G, B) that falls into the numerical range (0, 0, 0) to (15, 15, 15) to the total number of pixels is 0.01 (1%).

Upon completion of the initial registration processing described above, the sequence proceeds to step 92 in continuous authentication processing in FIG. 4A. In step 92, the obtaining unit 16 obtains image data of a new image captured by the photograph unit.

In step 94, the determination unit 22 determines whether the current operating mode in continuous authentication is the color histogram authentication mode. If the determination in step 94 is affirmative, the determination unit 22 calls the first authentication unit 18 and the sequence proceeds to step 96. Thus, the first authentication unit 18 carries out color histogram authentication processing in step 96.

The histogram authentication processing will be described with reference to FIG. 7. First, in step 150, the first authentication unit 18 obtains information about the face area of the user from the color histogram information 28 stored in the first storage unit 30. The information about the face area of the user indicates the position and size of the face area.

In step 152, in the image obtained in step 92 above, the first authentication unit 18 uses the face area about which information has been obtained in step 150 as a reference to search for an area in which the similarity of its color histogram with the reference color histogram for the reference face area is maximized. The searched-for area is the face area in the image.

When searching for the area having maximum similarity, the first authentication unit 18 uses the position of the face area obtained in step 150 being used as a reference to calculate the similarity of a color histogram for each of a plurality of candidate areas that are present at the reference position and a plurality of positions around the reference position. The first authentication unit 18 selects the candidate area having the maximum similarity from the plurality of candidate areas.

In step 154, the first authentication unit 18 first establishes a corresponding body area with a size that is appropriate for the size of the face area below the face area searched for in step 150.

In the image, the first authentication unit 18 then searches for an area in which the similarity of the image's color histogram with the reference color histogram of the set body area is maximized. The searched-for area is the body area on the image.

As part of the search for the area having the maximum similarity, the first authentication unit 18 uses the position of the body area that has been set above being used as a reference position to calculate the similarity of a color histogram for each of a plurality of candidate areas that are present at the reference position and a plurality of positions around the reference position. The first authentication unit 18 selects the candidate area having the maximum similarity from the plurality of candidate areas.

In step 156, the first authentication unit 18 calculates a final similarity from both the similarity between the color histogram of the searched-for face area and the reference color histogram of the face area as well as the similarity between the color histogram of the searched-for body area and the reference color histogram of the body area.

If the similarity between the color histogram of the face area and the corresponding reference color histogram is denoted Sface and the similarity the color histogram of the body area and the corresponding reference color histogram is denoted Sbody, then the final similarity denoted Sfinal is calculated according to equation (1) below.

$$Sfinal = w \times Sface + (1-w) \times Sbody \quad (1)$$

where w is a weighting factor for the similarity Sface between the color histogram of the face area and the corresponding reference color histogram; the value of w is at least 0 and at most 1.

In step 158, the first authentication unit 18 stores the position and size of the face area of the user, which has been extracted from the newly obtained image, as well as the color histograms of the face area and body area in the first storage unit 30 as the color histogram information 28. This completes the color histogram authentication processing.

Upon completion of the above color histogram authentication processing, the sequence proceeds to step 98 in the continuous authentication processing in FIG. 4A. In step 98, the determination unit 22 determines whether to continue the color histogram authentication. Specifically, the determination unit 22 determines whether the color histogram similarity obtained in the color histogram authentication processing by the first authentication unit 18 is greater than or equal to a threshold. In this embodiment, the final similarity Sfinal is used as the similarity, for example.

If the color histogram similarity is greater than or equal to the threshold, the determination in step 98 becomes affirmative. The sequence then proceeds to step 100, where the determination unit 22 sets the color histogram authentication mode as the operation mode in continuous authentication. The sequence then returns to step 92.

As a result, while the final color histogram similarity obtained in the color histogram authentication processing is greater than or equal to the threshold, processing from step 92 to step 100 is repeated. Accordingly, continuous authentication is carried out for subsequent images through color histogram authentication.

If the final color histogram similarity is less than the threshold, the determination in step 98 becomes negative. The sequence then proceeds to step 102, where the determination unit 22 performs authentication method switchover determination to determine whether to switch the authentication method in continuous authentication to optical flow authentication. Specifically, the determination unit 22 determines whether the final color histogram similarity has fallen below the threshold due to a sharp change in luminance over the entire image.

More specifically, the determination unit 22 calculates a difference $(I_1(x, y) - I_2(x, y))$ in luminance between mutually associated pixels on two images $I_1$ and $I_2$ obtained consecutively by the obtaining unit 16. The determination unit 22 counts the number N of pixels for which the difference in luminance is greater than or equal to a threshold Th.

If the number N of pixels is greater than or equal to a fixed value, it may be determined that a sharp change in luminance has been caused by, for example, turning large lighting fixtures on or off. The portion for which a change in luminance is calculated is not limited to the entire image; a partial area on the image such as an area in which the face area and body area are excluded may undergo calculation of a change in luminance, for example.

In step 104, the determination unit 22 determines whether to switch the authentication method to optical flow authentication and continue continuous authentication, according to whether a sharp change in luminance has been detected in the authentication method switchover determination in step 102.

If a sharp change in luminance has been not been detected in authentication method switchover determination in step 102, it may be determined that the cause of the final similarity below the threshold is not a sharp change in the luminance of the image. Therefore, determination in step 104 is negative, so the sequence proceeds to step 124. In step 124, the determination unit 22 outputs a determination result indicating that the user has moved away from the information device, terminating the continuous authentication processing.

If a sharp change in luminance has been detected in authentication method switchover determination in step 102, the final similarity may have fallen below the threshold due to a sharp change in the luminance of the image. Accordingly, the determination in step 104 is affirmative, so the sequence proceeds to step 106.

In step 106, the determination unit 22 switches the operation mode in continuous authentication from the color histogram authentication mode to the optical flow authentication mode. In step 108, the notification unit 24 extracts the position and size of the face area from the color histogram information 28 stored in the first storage unit 30 and notifies the second authentication unit 20 of the extracted information about the face area. In step 110, the second authentication unit 20 carries out optical flow authentication processing.

As described above, if the color histogram similarity falls below the threshold in color histogram authentication and a sharp change in luminance is detected, the authentication apparatus 10 switches the authentication method used in continuous authentication to optical flow authentication. Therefore, discontinuation of continuous authentication due to a sharp change in the luminance of the image may be suppressed.

Optical flow authentication processing in step 110 will be described with reference to FIG. 8. First, in step 160, the second authentication unit 20 determines whether the feature point information 32 is yet to be stored in the second storage unit 34. Having feature point information 32 that is yet to be stored indicates that optical flow authentication has not been carried out in the previous cycle.

If the determination in step 160 is affirmative, the sequence proceeds to step 162, where the second authentication unit 20 obtains the position and size of the face area of the user, of which the second authentication unit 20 was notified by the notification unit 24 in step 108 in FIG. 4A.

Figure 6B:
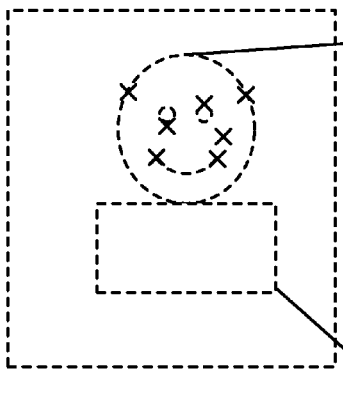
FIG. 6B is a drawing illustrating an example of feature point information.

In step 164, the second authentication unit 20 extracts feature points from the image obtained by the obtaining unit 16, according to the information obtained in step 162. In step 172, the second authentication unit 20 stores the extracted feature points in the second storage unit 34 as the feature point information 32. The feature point information 32 includes the position and size of the face area of the user as illustrated in FIG. 6B. The information about feature points is, for example, positions of feature points. Upon completion of processing in step 172, the optical flow authentication processing is concluded.

The target area in the feature point information 32 illustrated in FIG. 6B indicates that the center of the face area is located at coordinates (200, 100) on the image and that the size of the face area is 100 pixels wide and 150 pixels high. The feature point group in the feature point information 32 displayed in FIG. 6B indicates the locations of individual feature points; for example, the feature point group indicates that feature point 1 is located at coordinates (130, 70) on the image.

When the second authentication unit 20 stores the feature point information 32 in the second storage unit 34 as described above, the determination in step 160 becomes negative in the next cycle, and the sequence proceeds to step 166. In step 166, the second authentication unit 20 extracts the position and size of the face area from the feature point information 32, which has been stored in the second storage unit 34. The second authentication unit 20 then uses the position of the extracted face area as a reference to extract feature points from an area, eligible for extraction, that includes the reference position and areas around the reference position.

In step 168, the second authentication unit 20 judges correspondence between the feature points extracted in step 166 and the feature points that are stored in the second storage unit 34 as the feature point information 32. Specifically, the second authentication unit 20 judges correspondence by calculating an optical flow, which is a movement vector. In optical flow calculation, any method such as the method described in, for example, NPL 3 may be used.

Figure 9:
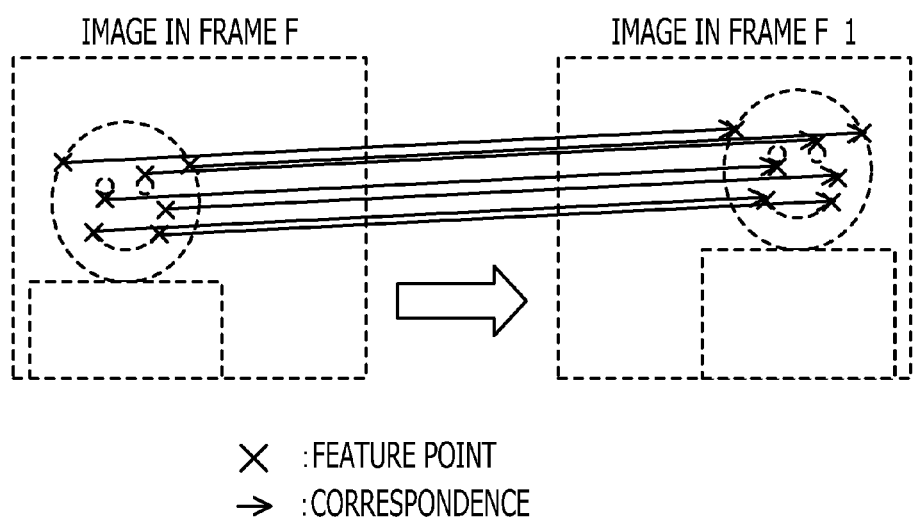
FIG. 9 is a drawing illustrating how correspondence of feature points in optical flow authentication processing is judged.

In optical flow authentication processing in this embodiment, feature points only in the face area are extracted and are judged for correspondence, as illustrated in FIG. 9. However, similar processing may also be carried out for the body area.

In step 170, the second authentication unit 20 determines the face area for the user according to the distribution of the feature points for which correspondence has been judged. In the determination of the face area, an average position for the feature points for which correspondence has been judged is calculated, for example. The average position is the position of center of the face area.

To determine the face area, the second authentication unit 20 uses the position of center as the center and establishes an area having a fixed shape in which all feature points for which correspondence has been judged are included.

The determination of the face area is not limited to the above method. For example, it is also possible to make a determination by using a ratio between a distance from the position of center of the face area to a feature point and a distance from the feature point to the boundary of the face area, these distances being obtained when optical flow authentication processing is executed for the first time.

Figure 10:
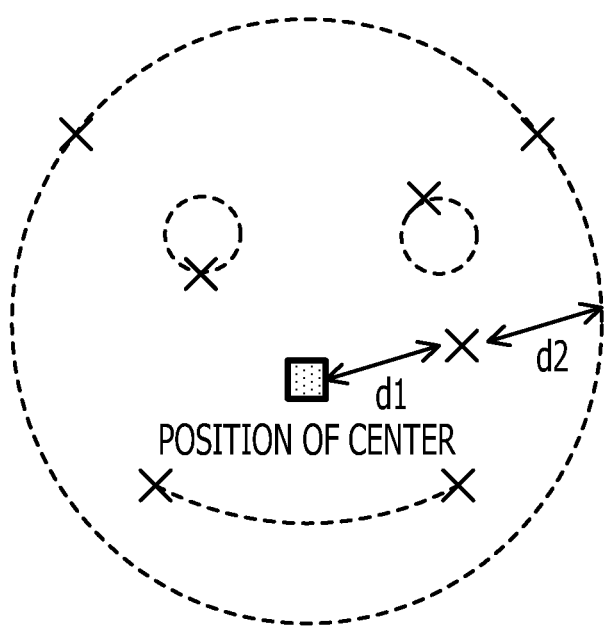
FIG. 10 is a drawing illustrating calculations of a face area in optical flow authentication processing.

Specifically, when optical flow authentication processing is executed for the first time, a distance d1 from the position of center of the face area to each feature point and a distance d2 from the feature point to the boundary of the face area are stored, as illustrated in FIG. 10. A distance D from the position of center of the face area to the boundary of the face area is calculated according to equation (2) below.

$$D = e1 \times (d1 + d2)/d1 \quad (2)$$

In equation (2), e1 indicates the distance from the position of center of the face area to the feature point, the distance having been obtained in the determination of the face area. Although, in FIG. 10, d1 and d2 are only indicated for a single feature point, the above processing may be carried out for all feature points. In this case, the face area may be determined by obtaining the average position of the boundary of the face area and then by fitting an area that has a fixed shape.

The extracted feature points may include some feature points of the background area, depending on the actual face position of the user at the time of feature point extraction. In view of this, individual extracted feature points may be individually assigned reliability to determine the face area.

Reliability may be assigned so that, for example, the smaller the distance from the position of center of the feature point group is, the higher reliability is. When the face area is determined, if only feature points that have high reliability are used or individual feature points are weighted according to the reliability, precision in the determination of the face area may be improved.

In step 172, the second authentication unit 20 stores the position and size of the face area and the positions of the feature points, which have obtained in the above processing, in the second storage unit 34 as the feature point information 32, terminating the optical flow authentication processing.

Figure 4B:
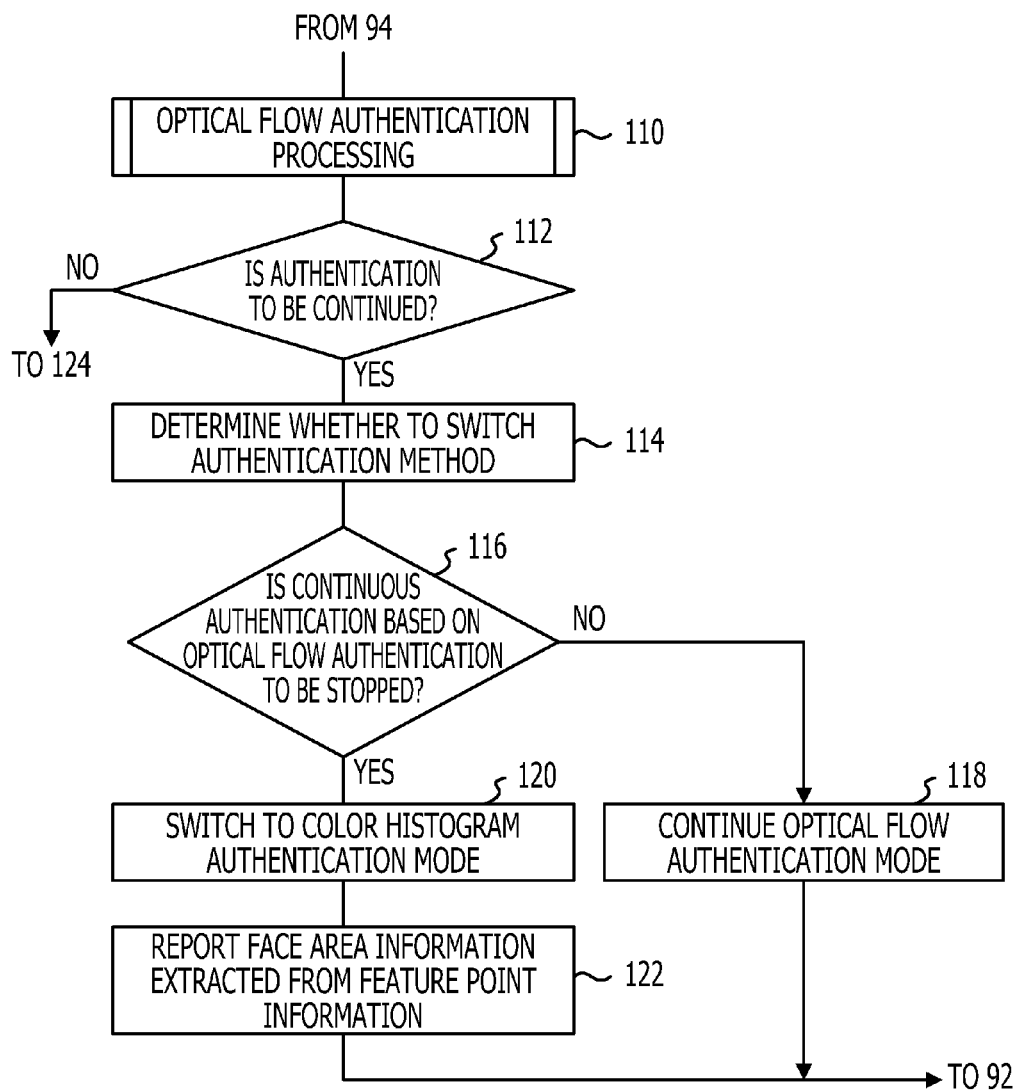

Upon completion of the above optical flow authentication processing, the sequence proceeds to step 112 in continuous authentication processing illustrated in FIG. 4B. In step 112, the determination unit 22 determines whether to continue continuous authentication according to the result in the optical flow authentication processing. Specifically, if the number of feature points for which correspondence has been judged is less than a given value in the optical flow authentication processing, the determination in step 112 becomes negative, so the sequence proceeds to step 124. This is because the user is likely to have moved away from the information device.

In step 124, the determination unit 22 outputs a determination result indicating that the user has moved away from the information device, terminating the optical flow authentication processing.

If the determination in step 112 is affirmative, the sequence proceeds to step 114, where the determination unit 22 performs authentication method switchover determination in which whether to switch the authentication method in continuous authentication to color histogram authentication is determined. Specifically, the determination unit 22 determines whether a sharp change in the luminance of the image has subsided.

More specifically, the determination unit 22 calculates a difference $(I_1(x, y)-I_2(x, y))$ in luminance between mutually associated pixels on the two consecutive images $I_1$ and $I_2$ obtained by the obtaining unit 16. The determination unit 22 counts the number N of pixels for which the difference in luminance is greater than or equal to a threshold Th. If the number N of pixels is less than a fixed value, it may be determined that a sharp change in the luminance of the image, which was caused by, for example large lighting fixtures being turned on or off, has subsided. The portion for which a change in luminance is calculated is not limited to the entire image; a partial area on the image such as an area in which the face area and body area are excluded may undergo calculation of a change in luminance, for example.

In authentication method switchover determination in step 114, similarity of color histograms may be used. Specifically, color histograms $C_1$ and $C_2$ of the face area may be obtained from the two consecutive images $I_1$ and $I_2$ obtained by the obtaining unit 16. If similarity between these color histograms is adequately high, the determination unit 22 may determine that a sharp change in the luminance of the image has subsided.

In step 116, the determination unit 22 determines whether to stop continuous authentication based on optical flow authentication, according to the determination result obtained in step 114 as to whether a sharp change in the luminance of the image has subsided. If it is determined in authentication method switchover determination in step 114 that sharp change in luminance has not subsided, then there is a possibility that if the authentication method in continuous authentication is switched to color histogram authentication, continuous authentication may be interrupted due to a sharp change in the luminance of the image. If the determination in step 116 is negative, therefore, the sequence proceeds to step 118. In step 118, the determination unit 22 sets the operation mode of continuous authentication to the optical flow authentication mode, after which the sequence returns to step 92.

Thus, while sharp change in the luminance of the image continues, the determinations in steps 94 and 116 become negative, repeating steps 92, 94, and 110 to 118. That is, continuous authentication based on optical flow authentication is carried out.

As described above, however, optical flow authentication undergoes a larger processing load than color histogram authentication and is less robust with respect to continuous authentication than color histogram authentication. Accordingly, optical flow authentication is not suitable to lengthy periods of authentication.

If a sharp change in the luminance of the image has subsided, the possibility that continuous authentication based on color histogram authentication is interrupted is reduced. If the determination in step 116 is affirmative, therefore, the sequence proceeds to step 120, where the determination unit 22 switches the operation mode in continuous authentication from the optical flow authentication mode to the color histogram authentication mode.

In step 122, the notification unit 24 extracts the position and size of the face area from the feature point information 32 stored in the second storage unit 34. The notification unit 24 then notifies the first authentication unit 18 of the extracted information about the face area, after which the sequence returns to step 92.

In subsequent processing, each time the result in steps 94 and 98 is determined to be affirmative, processing from step 92 to step 100 is repeated, resuming continuous authentication based on color histogram authentication.

Second Embodiment

Next, a second embodiment of the technology in the present disclosure will be described. Elements that are the same as in the first embodiment will be given the same reference numerals and repeated descriptions will be omitted. Only portions different from the first embodiment will be described.

Figure 11:
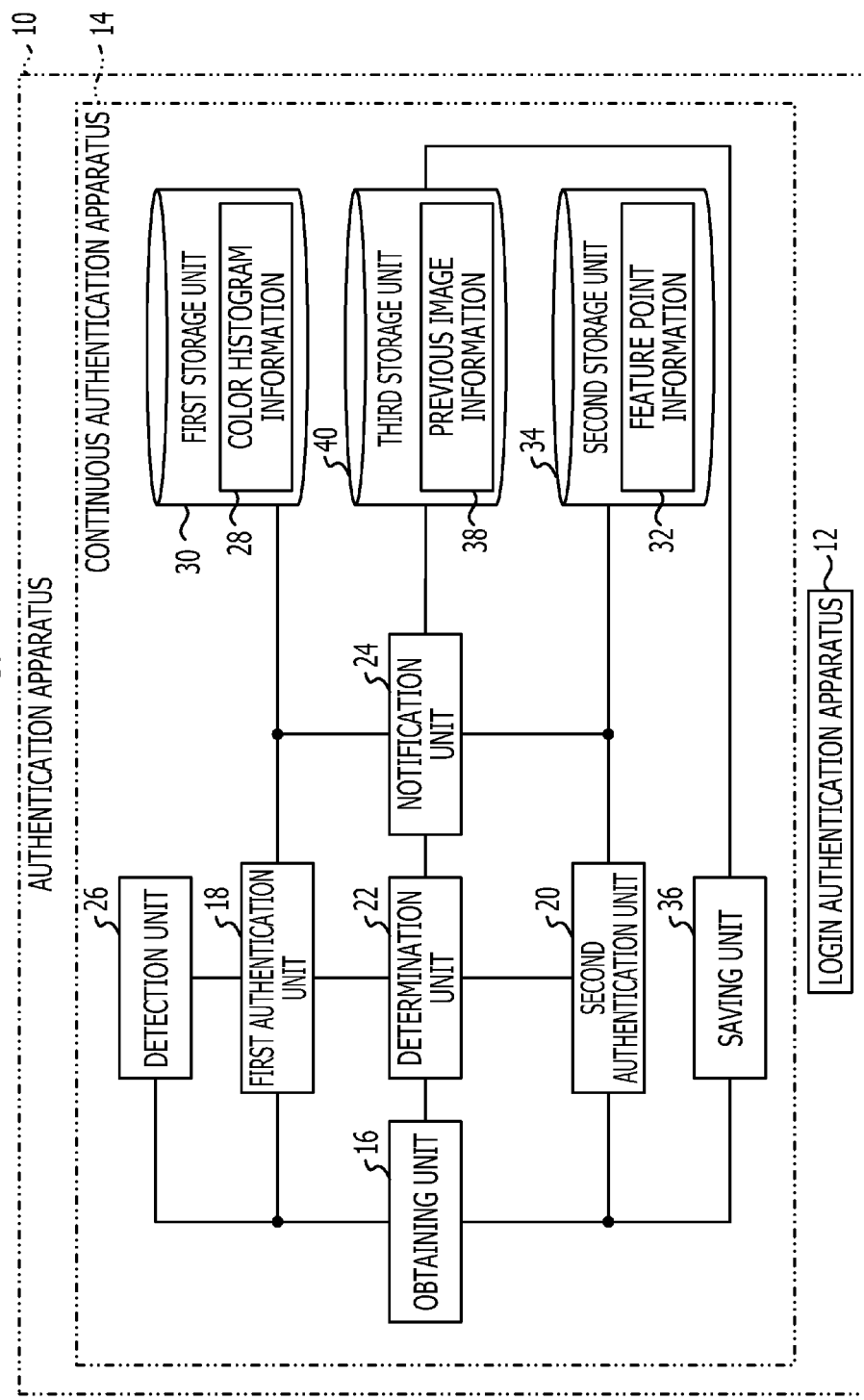
FIG. 11 is a functional block diagram of an authentication apparatus described in second and third embodiments.

FIG. 11 is a functional block diagram of the authentication apparatus 10 according to the second embodiment. In the second embodiment, the continuous authentication apparatus 14 further includes a saving unit 36 and a third storage 40 unit that stores previous image information 38. Each time the obtaining unit 16 obtains an image, the saving unit 36 stores data of the obtained image in the third storage 40 as the previous image information 38.

In the second embodiment, an upper limit is set for the number of images that may be stored in the third storage 40 as the previous image information 38. When the number of image stored in the third storage 40 reaches the upper limit, the saving unit 36 deletes, from the third storage 40, the image data of the image that was stored at the oldest time. Then the saving unit 36 stores the image data of a new image in the third storage 40.

When the authentication apparatus 10 according to the second embodiment is implemented by the computer 42 illustrated in FIG. 2, the continuous authentication program 62 according to the second embodiment further includes a previous image saving process 76 as indicated by broken lines in FIG. 2. In this case, the CPU 44 executes the previous image saving process 76 to operate as the saving unit 36 illustrated in FIG. 11. When the authentication apparatus 10 according to the second embodiment is implemented by the computer 42 illustrated in FIG. 2, the storage unit 48 further stores the previous image information 38. In this case, the storage unit 48, which stores the previous image information 38, doubles as the third storage 40, and a partial area in the memory 46 is used as storage area for the previous image information 38.

Next, the effect of the second embodiment will be described. If, in continuous authentication processing in the first embodiment, the luminance of an image changes sharply while continuous authentication based on color histogram authentication is performed, the authentication method is switched. The second authentication unit 20 is then notified of the latest face area information (as indicated in step 108 in FIG. 4A).

However, there is a time lag from when the luminance of the image starts to change until the color histogram similarity falls below a threshold and the sharp change in the luminance of the image is detected.

Figure 13A:
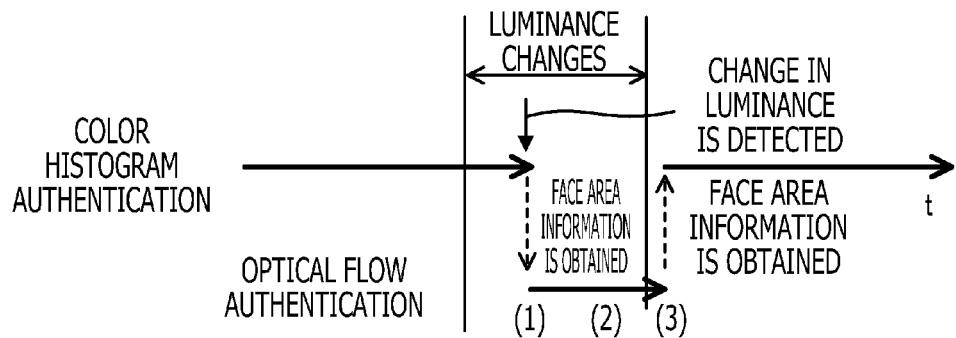
FIG. 13A is a timing diagram illustrating an example of switchovers between authentication methods in the first embodiment.

As illustrated in FIG. 13A, for example, the second authentication unit 20 may be sent face area information with low precision that has been detected after the processing precision of the first authentication unit 18 has started to get lower. Optical flow authentication may also be affected and processing precision may be lowered.

The second embodiment considers the above situation. Continuous authentication processing according to the second embodiment will be described below with reference to FIGS. 12A and 12B, focusing on only portions different from continuous authentication processing in the first embodiment.

In continuous authentication processing according to the second embodiment, the obtaining unit 16 obtains an image in step 92, after which the saving unit 36 stores the image data of the new image in the third storage 40 as the previous image information 38 in step 180.

In step 104, the determination unit 22 determines to switch from color histogram authentication to optical flow authentication (the determination in step 104 is affirmative), the sequence then proceeds to step 106, where the determination unit 22 switches the operation mode of continuous authentication to optical flow authentication. The sequence then proceeds to step 182.

In the second embodiment, the first authentication unit 18 stores color histogram information 28 about images for (x+1) frames (x≥1) in the first storage unit 30. In step 182, the notification unit 24 extracts face area information from the first storage unit 30 according to the color histogram information 28 about the image x frames prior to the latest image at a point in time when a change in luminance is detected. The notification unit 24 then notifies the second authentication unit 20 of the extracted face area information. The face area information is information about the position and size of the face area.

Thus, the second authentication unit 20 carries out optical flow authentication according to both information about the face area on the image x frames prior to the latest image as well as the image data of the image x frames prior to the latest image. The image data is obtained from the previous image information 38 stored in the third storage 40.

Figure 13B:
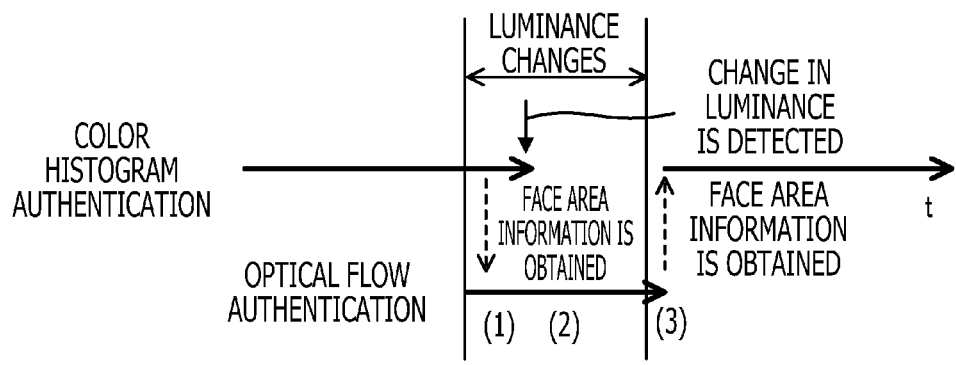
FIG. 13B is a timing diagram illustrating an example of switchovers between the authentication methods in the second embodiment.

Thus, when the authentication method is switched from color histogram authentication to optical flow authentication, information before processing precision of the first authentication unit 18 lowers is used to start optical flow authentication, as illustrated at (1) in FIG. 13B. Therefore, it is possible to suppress lowering of processing precision in optical flow authentication due to the time lag described above.

As described above, when the authentication method is switched from color histogram authentication to optical flow authentication, information about the image x frames prior to the latest image is used to start optical flow authentication.

Figure 14:
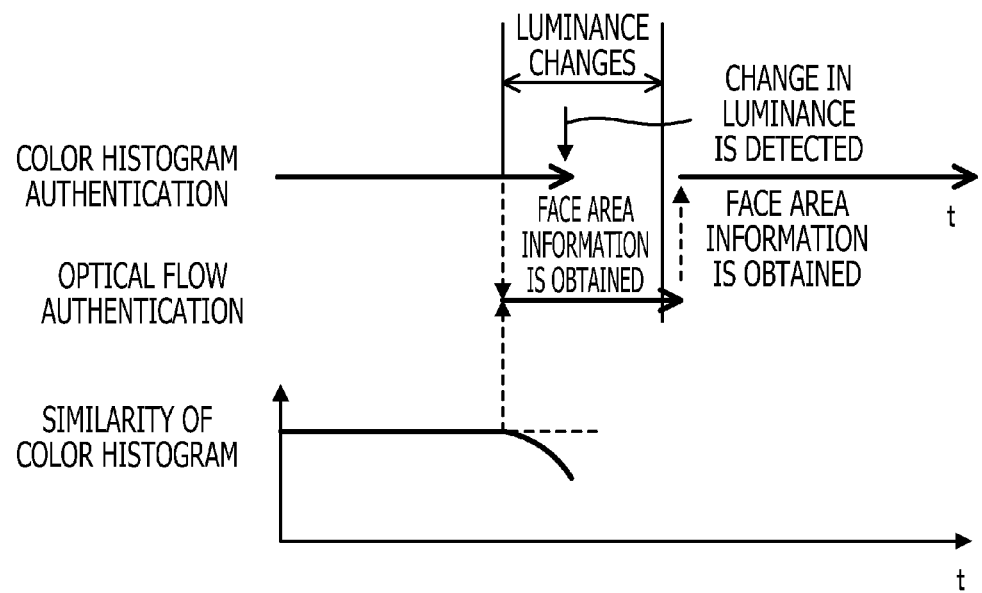
FIG. 14 is a timing diagram illustrating another example of switchovers between the authentication methods in the second embodiment.

However, this is not a limitation. As illustrated in FIG. 14, for example, when a change in luminance is detected, a trend of color histogram similarity so far is referred to. The second authentication unit 20 may use information about an image, which is obtained before color histogram similarity starts to lower due to the change in luminance, to start optical flow authentication.

That is, the number of frames x may be dynamically changed according to when a change in luminance starts to affect the color histogram similarity. Thus, it may be possible to more reliably suppress precision in optical flow authentication processing from being lowered.

Third Embodiment

Next, a third embodiment of the technology in the present disclosure will be described. The structure in the third embodiment is the same as the structure in the second embodiment, so elements that are the same as in the second embodiment will be given the same reference numerals and a description of the structure will be omitted. The effect of the third structure will be described below.

In the first and second embodiments described above, when the fact that a sharp change in the luminance of the image has subsided is detected during execution of optical flow authentication as illustrated in FIGS. 13A and 13B, optical flow authentication is stopped. At substantially the same time, color histogram authentication is resumed. If a sharp change in the luminance of the image occurs again immediately after the resumption of the color histogram authentication, however, continuous authentication may be interrupted.

For example, states in which a sharp change in the luminance of the image occurs frequently as described above include situations such as where illumination conditions change every moment because a mobile information device is used in an electric train, an automobile, or another moving body.

Figure 15B:
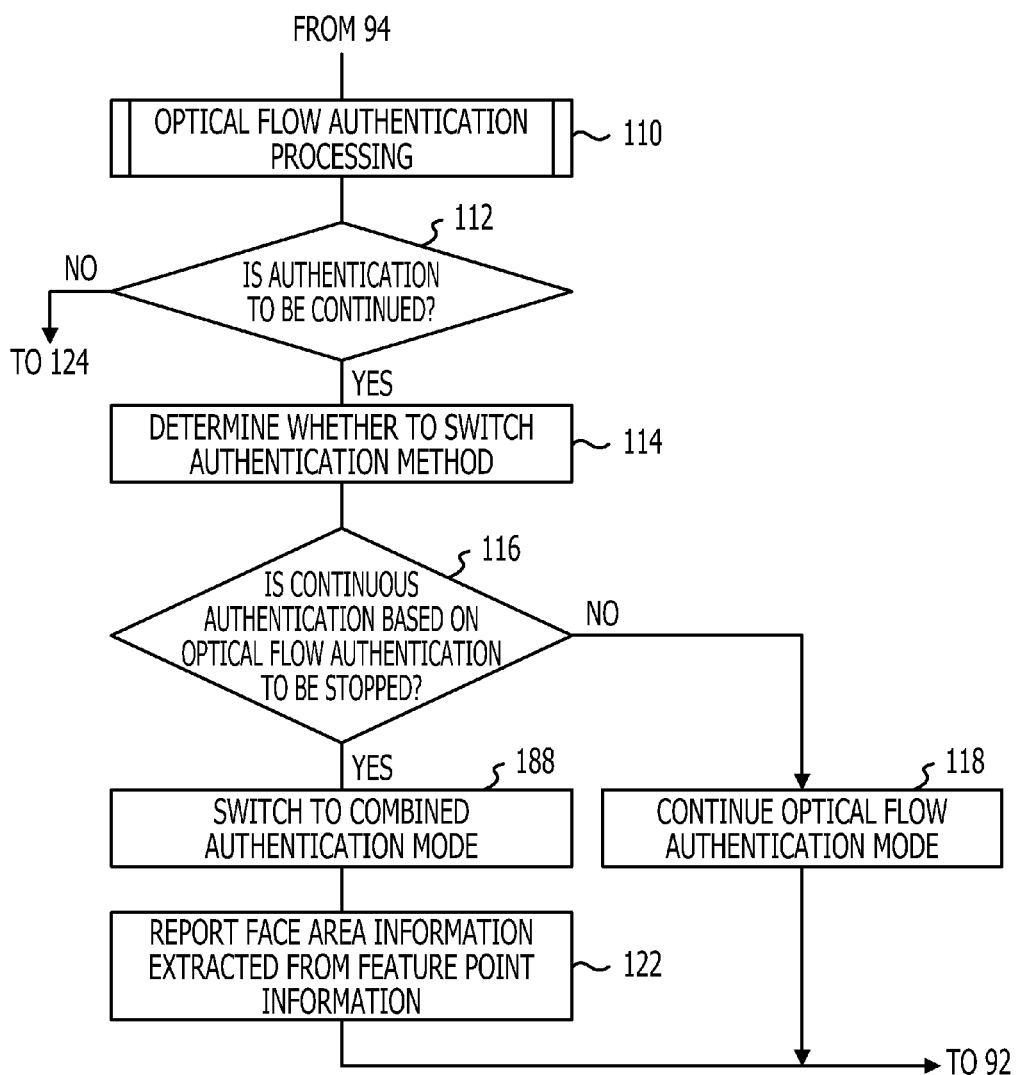

The third embodiment considers the above situation. Continuous authentication processing according to the third embodiment will be described below with reference to FIGS. 15A and 15B, focusing on only portions different from continuous authentication processing described in the second embodiment.

In continuous authentication processing according to the third embodiment, image data is stored in the third storage 40 in step 180, after which the determination unit 22 determines in step 184 whether the operation mode in continuous authentication is the combined authentication mode. If the determination in step 184 is negative, the sequence proceeds to step 94, after which processing in step 94 and later is carried as in the second embodiment.

In continuous authentication processing according to the third embodiment, if, while performing continuous authentication based on optical flow authentication, the determination in step 116 is affirmative, the sequence proceeds to step 118. An affirmative determination in step 116 is when optical flow authentication is terminated because sharp change in the luminance of the image has subsided.

In step 188, the determination unit 22 switches the operation mode of continuous authentication from the optical flow authentication mode to the combined authentication mode. Thus, the determination in step 184 above becomes affirmative and the sequence then proceeds to step 186, where combined authentication mode processing is performed. The sequence then returns to step 92. In the combined authentication mode, both continuous authentication and optical flow authentication are performed.

Figure 16:
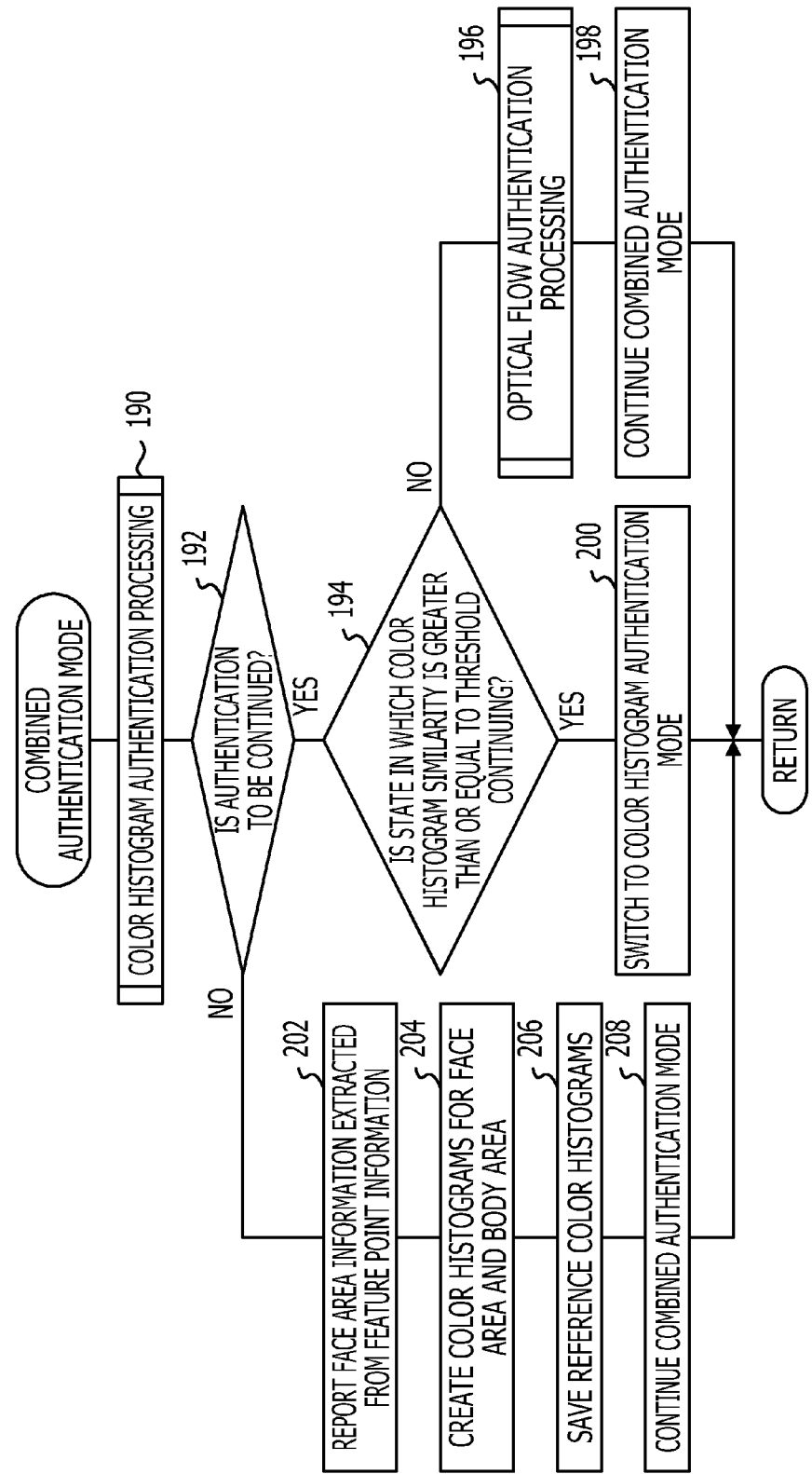
FIG. 16 is a flowchart of combined authentication mode processing.

Combined authentication mode processing will be described with reference to FIG. 16. First, in step 190, the first authentication unit 18 performs color histogram authentication processing illustrated in FIG. 7.

Next in step 192, the determination unit 22 determines whether to continue color histogram authentication. Specifically, the determination unit 22 determines whether a color histogram similarity obtained in color histogram authentication processing is greater than or equal to a threshold. In this embodiment, the similarity is the final similarity.

If the color histogram similarity is greater than or equal to the threshold, the determination in step 192 becomes affirmative, so the sequence proceeds to step 194, where the determination unit 22 determines whether the color histogram similarity continues to be greater than or equal to the threshold for at least a fixed period.

Figure 8:
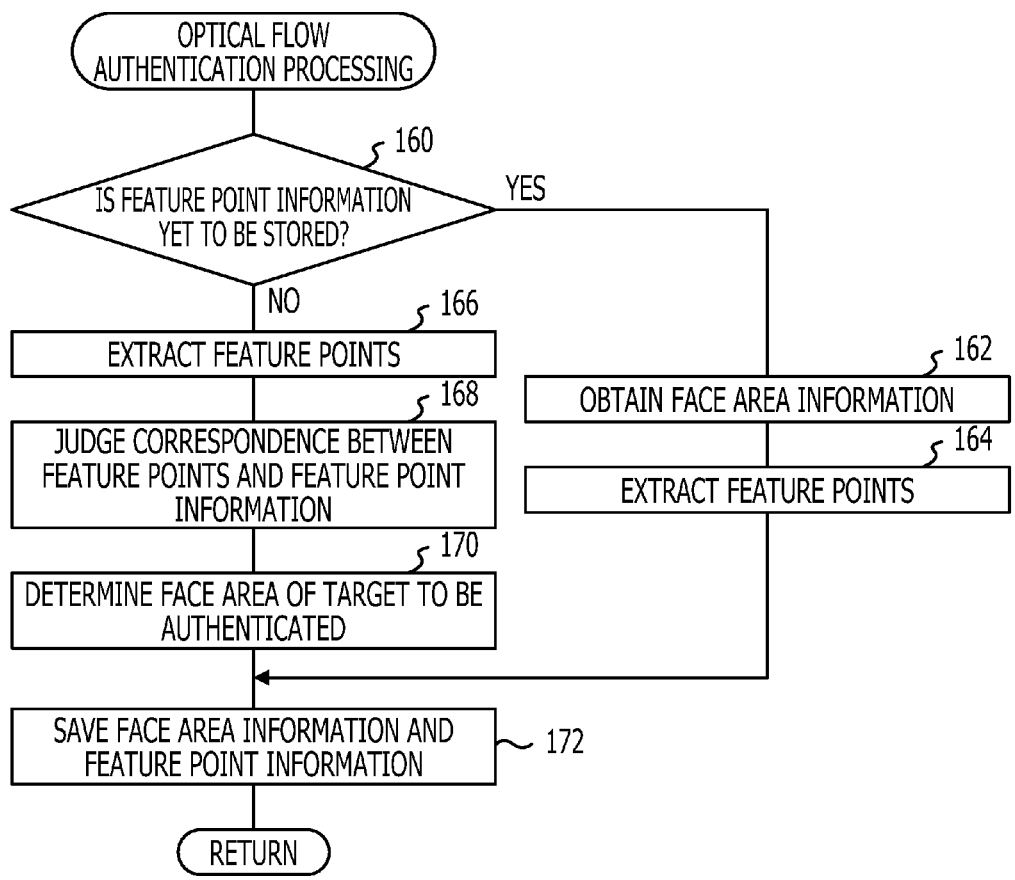
FIG. 8 is a flowchart of optical flow authentication processing.

If the determination in step 194 is negative, the sequence proceeds to step 196, where the second authentication unit 20 performs optical flow authentication processing illustrated in FIG. 8.

In step 198, the determination unit 22 sets the combined authentication mode as the operation mode of continuous authentication to continue the combined authentication mode. The determination unit 22 then temporarily stops combined authentication mode processing.

Figure 17:
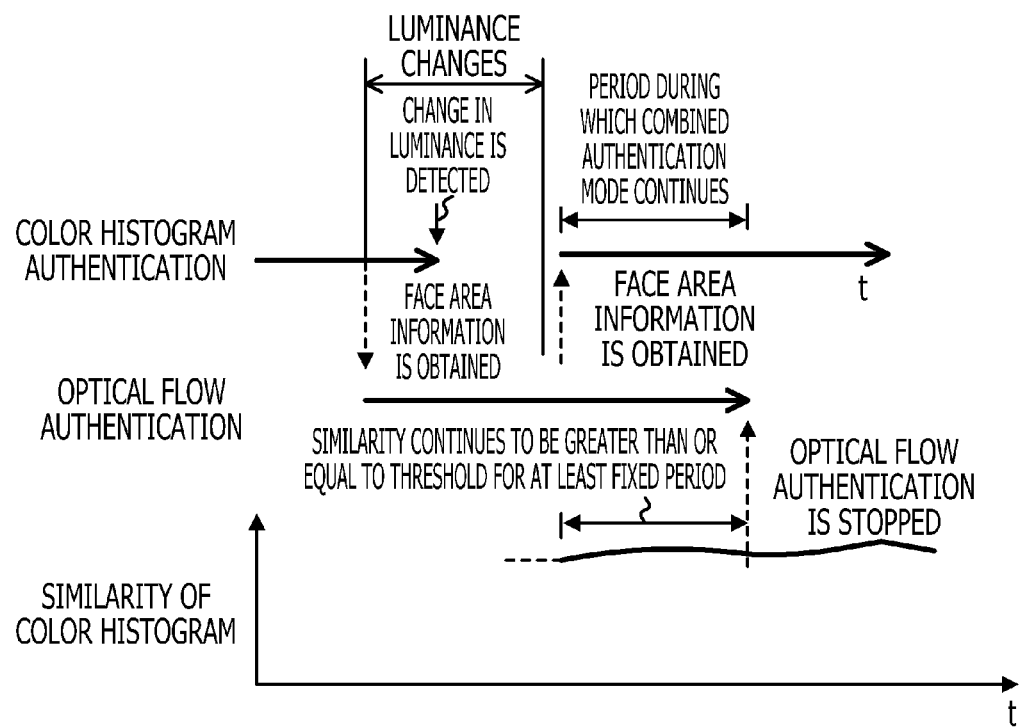
FIG. 17 is a timing diagram illustrating conditions under which optical flow authentication is stopped in a combined authentication mode.

As illustrated in FIG. 17, color histogram authentication and optical flow authentication are executed concurrently until the color histogram similarity obtained in color histogram authentication continues to be greater than or equal to the threshold for at least the fixed period.

If the color histogram similarity continues to be greater than or equal to the threshold for at least the fixed period, the determination in step 194 becomes affirmative and the sequence proceeds to step 200. In step 200, the determination unit 22 stops optical flow authentication executed by the second authentication unit 20 and switches the operation mode in continuous authentication from the combined authentication mode to the color histogram authentication mode.

When the color histogram similarity has continued to be greater than or equal to the threshold for at least the fixed period, the determination unit 22 determines that a sharp change in the luminance of the image has subsided and optical authentication is then terminated. Accordingly, it may be possible to suppress the processing load from becoming excessive and stability in continuous authentication from being lowered.

If the color histogram similarity falls below the threshold, the termination in step 192 becomes negative before the determination in step 194 becomes affirmative. For example, when the color histogram similarity falls below the threshold before the color histogram similarity continues to be greater than or equal to the threshold for at least the fixed period, the determination in step 192 becomes negative.

Then, the sequence proceeds to step 202, where the notification unit 24 extracts the position and size of the face area from the feature point information 32 stored in the second storage unit 34 and notifies the first authentication unit 18 of the extracted information about the face area. In step 204, the first authentication unit 18 creates color histograms of the face area and body area of the user from the face area information that the first authentication unit 18 was notified of by the notification unit 24.

In step 206, the first authentication unit 18 stores the color histograms of the face area and body area of the user, which have been created in step 204, in the first storage unit 30 as reference color histograms. The reference color histograms stored in the first storage unit 30 as part of the color histogram information 28 are updated. In step 208, the determination unit 22 sets the operation mode of continuous authentication to the combined authentication mode, and continues the combined authentication mode.

If a sharp change in the luminance of the image occurs due to, for example, a change in illumination conditions while in the combined authentication mode and the color histogram similarity is thereby lowered, the reference color histograms are updated. As illustrated in FIG. 18, similarity with the updated reference color histograms may recover. As a result, precision in color histogram authentication may also recover.

If the color histogram similarity continues to be greater than or equal to the threshold for at least the fixed period, optical flow authentication is stopped and the operation mode of continuous authentication is switched to the color histogram authentication mode, as described above. This mechanism suppresses optical flow authentication from being frequently stopped and resumed. Accordingly, it may be possible to suppress continuous authentication from being discontinued even when a sharp change in the luminance of the image occurs frequently.

When continuous authentication processing according to the above embodiments is started, the color histogram of the face area extracted by the detection unit 26 and the color histogram of the body area identified from the face area are registered as the reference color histograms. However, this is not a limitation. For example, if the login authentication apparatus 12 is structured so that it performs, as login authentication, face authentication in which whether the face of the user matches the face of a legitimate user registered in advance is determined, the reference color histograms may be stored according to the extraction result obtained from the face area in the face authentication. In this case, the structure of the continuous authentication apparatus 14 may be simplified by removing the detection unit 26.

In the above embodiments, upon completion of login authentication, face detection is carried out, and the relevant reference color histogram is registered immediately after the face area is detected. However, this is not a limitation. For example, face area detection and reference color histogram update may be carried out during continuous authentication based on color histogram, on a periodic basis, or at a time when, for example, a slight change in the luminance of the image is detected due to a change in the incident angle of sunlight or another cause. Regions that are registered as reference color histograms are not limited to the face area and body area of the user. For example, the color histogram of either the face area or body area may be stored. Alternatively, a color histogram of only part of the face or body may be stored.

In the above embodiments, after login authentication, the technology in the present disclosure is applied to continuous authentication in which whether the user who has passed login authentication is continuing to use the information device is determined. However, the technology in the present disclosure is not limited to the above aspect. For example, in an aspect in which a video (moving picture) or voice is reproduced or an application program is executed only while the user is currently using the information device and the reproduction of a video and the like and other similar functions are stopped when the user is absent from the information device, the technology in the present disclosure may be applied to determine whether the user is present or absent.

In the above embodiments, an aspect in which the continuous authentication program 62 is stored (installed) in the storage unit 48 in advance has been described, but this is not a limitation. The continuous authentication program 62 may also be provided by being recorded on a compact disc-read-only memory (CD-ROM), a digital versatile disc read-only memory (DVD-ROM), or another computer-readable recoding medium.

All literature, patent applications, and technical standards cited in this description are incorporated into this description by reference to the same extent as when the incorporation of individual literature, patent applications, and technical standards by reference is described specifically and individually.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A user detecting apparatus comprising:
a memory; and
a processor coupled to the memory and configured to execute a process including:
obtaining a first image captured by a camera,
executing a first authentication process for the first image, the first authentication process authenticating a user captured by the camera using a similarity between a color histogram extracted from the first image and a reference histogram,
obtaining a second image which is captured by the camera after the first image,
switching from the first authentication process to a second authentication process when a difference between first luminance information of the first image and second luminance information of the second image is greater than a threshold, the second authentication process authenticating the user using feature points extracted from the second image, and
executing the second authentication process for the second image after the switching.

2. The user detecting apparatus according to claim 1, the process further comprising:
obtaining a plurality of images including the first image and the second image, and
switching between the first mode and the second mode for each of the plurality of images.

3. The user detecting apparatus according to claim 2, wherein the executing of the second authentication process detects a user-associated area according to a comparison between the feature points from the second image and feature points extracted from the first image.

4. The user detecting apparatus according to claim 3, wherein the
switching is executed when the similarity is less than another threshold.

5. The user detecting apparatus according to claim 4, the process further comprising:
switching from the second authentication process to the first authentication process when the second authentication process succeeds during a given period.

6. The user detecting apparatus according to claim 5, the process further comprising:
storing a color histogram detected from a third image included in the plurality of image as the reference color histogram.

7. The user detecting apparatus according to claim 2, the process further comprising:
storing information regarding the feature points of the second image in the memory,
extracting other feature points from a fourth image included in the plurality of images, and
executing the second authentication process for the fourth image based on the other feature points from the fourth image and the feature points from the second image.

8. A user detecting method executed by a computer, the method comprising:
obtaining a first image captured by a camera,
executing a first authentication process for the first image, the first authentication process authenticating a user captured by the camera using a similarity between a color histogram extracted from the first image and a reference histogram,
obtaining a second image which is captured by the camera after the first image,
switching from the first authentication process to a second authentication process when a difference between first luminance information of the first image and second luminance information of the second image is greater than a threshold, the second authentication process authenticating the user using feature points extracted from the second image, and
executing the second authentication process for the second image after the switching.

9. The user detecting method according to claim 8, further comprising:
sequentially obtaining a plurality of images including the first image and the second image, and
switching between the first mode and the second mode for each of the plurality of images.

10. The user detecting method according to claim 9, wherein the executing of the second authentication process detects a user-associated area according to a comparison between the feature points from the second image and feature points extracted from the first image.

11. The user detecting method according to claim 10, wherein the calculating of the difference comprising:
switching is executed when the similarity is less than another threshold.

12. The user detecting method according to claim 11, further comprising:
switching from the second authentication process to the first authentication process when the second authentication process succeeds during a given period.

13. The user detecting method according to claim 12, further comprising:
storing a color histogram detected from a third image included in the plurality of images as the reference color histogram.

14. The user detecting method according to claim 9, further comprising:
storing information regarding the feature points of the second image in the memory,
extracting other feature points from a fourth image included in the plurality of images, and
executing the second authentication process for the fourth image based on the other feature points from the fourth image and the feature points from the second image.

15. A non-transitory computer-readable recording medium storing a program that causes a computer to execute a process to detect a user, the process comprising:
obtaining a first image captured by a camera,
executing a first authentication process for the first image, the first authentication process authenticating a user captured by the camera using a similarity between a color histogram extracted from the first image and a reference histogram,
obtaining a second image which is captured by the camera after the first image,
switching from the first authentication process to a second authentication process when a difference between first luminance information of the first image and second luminance information of the second image is greater than a threshold, the second authentication process authenticating the user using feature points extracted from the second image, and
executing the second authentication process for the second image after the switching.

* * * * *